United States Patent [19]

Vinciarelli

[11] Patent Number: 5,079,686
[45] Date of Patent: Jan. 7, 1992

[54] ENHANCEMENT-MODE ZERO-CURRENT SWITCHING CONVERTER

[75] Inventor: Patrizio Vinciarelli, Boston, Mass.

[73] Assignee: VLT Corporation, San Antonio, Tex.

[21] Appl. No.: 535,382

[22] Filed: Jun. 8, 1990

[51] Int. Cl.⁵ .............................................. H02M 3/28
[52] U.S. Cl. ........................................ 363/15; 363/65; 363/95
[58] Field of Search ...................... 363/15, 65, 71, 72, 363/95

[56] References Cited

U.S. PATENT DOCUMENTS

| | | | |
|---|---|---|---|
| 4,415,959 | 11/1983 | Vinciarelli | 363/21 |
| 4,425,613 | 1/1984 | Shelly | 363/71 |
| 4,455,545 | 6/1984 | Shelly | 336/200 |
| 4,648,020 | 3/1987 | Vinciarelli | 363/71 |
| 4,675,797 | 6/1987 | Vinciarelli | 363/21 |
| 4,695,933 | 9/1987 | Nguyen et al. | 363/71 |
| 4,783,728 | 11/1988 | Hoffman | 363/71 |
| 4,924,170 | 5/1990 | Henze | 363/71 |
| 4,945,462 | 7/1990 | Lieberman | 363/17 |
| 4,964,028 | 10/1990 | Spataro | 363/21 |

OTHER PUBLICATIONS

Vicor Product Catalog, Zero-Current Switching Conversion Products, 6/88.

*Primary Examiner*—Steven L. Stephan
*Assistant Examiner*—Jeffrey Sterrett
*Attorney, Agent, or Firm*—Fish & Richardson

[57] ABSTRACT

An enhancement-mode converter module, which converts power from an input source for delivery to a load in a series of quantized energy transfer cycles, includes a zero-current switching converter, an enhancement-mode controller, an an input-output port for carrying synchronizing information to and from an external synchronizing bus. The enhancement mode controller adjusts the frequency at which energy transfer cycles are triggered in the zero-current switching converter to be the greater of a first frequency, which will regulate the load voltage to a setpoint voltage, Vsp, characteristic of the enhancement-mode controller, or a second frequency, which is indicated by an input delivered to the input-output port. In an array of such enhancement mode converter modules, wherein the outputs of all of the enhancement-mode converter modules are connected together to deliver power to a load, and wherein synchronizing information carried to a synchronizing bus by the input-output port of any of the converter modules is delivered as an input to the input-output ports of the balance of the converter modules by propagation along the synchronizing bus, all of the converter modules will synchronize to an operating frequency determined by the enhancement-mode controller having the highest setpoint voltage, and each of the converter modules will deliver an essentially constant fraction of the total power delivered to the load by the array.

57 Claims, 15 Drawing Sheets

ENHANCEMENT-MODE ZERO-CURRENT SWITCHING CONVERTER

BACKGROUND OF THE INVENTION

This invention relates to arrays of DC-DC converters of the zero-current switching type.

Known arrays of zero-current switching converters (such as those described in Vinciarelli, U.S. Pat. No. 4,648,020, incorporated herein by reference) exploit the pulse by pulse energy quantization inherent in zero-current switching converters as a mechanism for power sharing by the converters in the array. In some such arrays, energy transfer cycles in one or more zero-current switching booster modules, each of which includes a zero-current switching converter, are synchronously triggered at a frequency which is controlled by a master controller. In one scheme, the master controller is part of a zero-current switching driver module, which includes both a zero-current switching converter and the master controller. An output of the driver module adjusts the operating frequency of the array so as to maintain the load voltage at a desired (setpoint) value. The zero-current switching converters in the driver and booster modules are characterized by an effective inductance (L) and a capacitance (C) which define a characteristic time scale, $\pi\sqrt{(L*C)}$, for the energy transfer cycle. If the characteristic time scales for all of the converters in the array are essentially equal, each converter module in the array will deliver an essentially constant fraction of the total power delivered to the load. Arrays of this kind permit modular power expansion while eliminating many of the drawbacks associated with alternative approaches (e.g. beat frequencies associated with arrays of unsynchronized converters; and saturated operation of converters in arrays which do not inherently share power).

The described array is comprised of two distinctly different kinds of converter modules: a driver and boosters. The driver incorporates the "intelligence" required to perform load voltage regulation and to communicate synchronizing information unidirectionally to the boosters; the boosters receive synchronizing information from, and augment the power handling capability of, the driver, but cannot, by themselves, perform load voltage regulation. This inherent asymmetry in structure and operation is apparent in the behavior of the described array under fault conditions: under these conditions, any of the booster modules can cease to deliver power without interrupting the operation of the array (provided only that the power drawn by the load does not exceed the sum of the power ratings of the remaining modules which comprise the array), whereas a failure of the driver module will compromise the operation of the entire array.

In another scheme described in U.S. Pat. No. 4,648,020, an array is formed of identical booster modules all controlled by a single phase shifting controller.

SUMMARY OF THE INVENTION

In general, the invention features an enhancement-mode power converter which converts power from an input source for delivery to a load; the converter includes an input power port for connection to the input source; an output power port for connection to the load; a zero-current switching converter connected to receive power via the input power port from the source and to deliver power via the output power port to the load in a series of quantized energy transfer cycles; and an enhancement-mode controller for setting an actual operating frequency at which the energy transfer cycles will occur in the zero-current switching converter; the controller accepts first and second inputs indicative of a first operating frequency and a second operating frequency, respectively; and the controller sets the actual operating frequency of the zero-current switching converter based on a comparison of the first and second inputs.

Preferred embodiments of the invention include the following features. The actual operating frequency is set to the greater of the first operating frequency or the second operating frequency. The zero-current switching converter is characterized by having an equivalent inductance (L) and a capacitance (C) which define a characteristic time scale for the energy transfer cycle of the zero-current switching converter. The enhancement-mode controller is characterized by a setpoint voltage (Vsp). The first operating frequency is determined by comparing the voltage across the load to the setpoint voltage, the first operating frequency being increased if the load voltage is less than the setpoint voltage, and being decreased if the load voltage is greater than the setpoint voltage. The second input indicative of the second operating frequency comprises synchronizing information carried into the enhancement-mode controller via an input port. Synchronizing information indicative of the actual operating frequency is delivered by the enhancement-mode controller to an output port.

In some embodiments there are two or more input ports, each input port being functionally redundant with respect to the others, and two or more output ports, each output port being functionally redundant with respect to the others. An input port and an output port may be combined into a single bidirectional input-output port, and there may be two or more functionally redundant bidirectional input-output ports.

In some embodiments at least two of the enhancement-mode power converters may be combined in a power conversion array, with each enhancement-mode power converter being connected between the input source and the load, and all of the enhancement-mode power converters having essentially the same characteristic time constant, the enhancement-mode controller of each enhancement-mode power converter delivering synchronizing information indicative of the actual operating frequency to an output port. A synchronizing bus permits propagation of the synchronizing information between the output ports of any of the enhancement-mode power converters and the input ports of all enhancement-mode power converters. The enhancement-mode power converters are arranged to operate synchronously at an array operating frequency corresponding to the first operating frequency of the enhancement-mode power converter which has the highest value of setpoint voltage. The synchronizing bus comprises a plurality of bidirectional coupling devices connected in series (e.g., in a closed ring), each bidirectional coupling device including a signal port for connection to the input port and the output port of one of the enhancement-mode converters, the serial connection of the bidirectional coupling devices permitting synchronizing information delivered to any of the signal ports from any of the output ports to be delivered to all of the signal ports of all of the bidirectional coupling devices for delivery to all of the input ports.

In some embodiments there are two or more redundant synchronizing buses, each permitting propagation of the synchronizing information between one of the output ports of one of the enhancement-mode power converters and one of the input ports of each of the enhancement-mode power converters which are included in the array.

In some embodiments two or more power conversion arrays are combined to form a power system in which each array is connected to at least one other array by an array coupling device which permits delivery of the synchronizing information bidirectionally between the power conversion arrays, all of the enhancement-mode power converters operating synchronously at a system operating frequency corresponding to the first operating frequency of the enhancement-mode power converter which has the highest value of the setpoint voltage.

The array or power system may also include at least one booster power converter having an input power port for connection to the input source; an output power port for connection to the load; a booster zero-current switching converter connected to receive power via the input power port from the source and to deliver power via the output power port to the load in a series of quantized energy transfer cycles, the booster zero-current switching converter being characterized by an equivalent inductance (L) and a capacitance (C) which define a characteristic time scale for the energy transfer cycle of said zero-current switching converter, the characteristic time constant being essentially equal to the characteristic time constants of the enhancement-mode power converters which are included within the array; and a controller for setting the actual operating frequency at which the energy transfer cycles will occur in the booster zero-current switching converter, the controller accepting an input indicative of the actual operating frequency, the input being delivered to the controller via an input port, the input port of the booster power converter being connected to the signal ports of the bidirectional coupling devices permitting delivery of the synchronizing information to the booster power converters, all of the enhancement-mode power converters and booster power converters included in the power conversion arrays, or power systems, operating synchronously at an array operating frequency corresponding to the first operating frequency of the enhancement-mode power converter included in the power conversion array, or power system, which has the highest value of setpoint voltage.

In preferred embodiments, the setpoint voltages of the enhancement-mode power converters included in the power conversion arrays, or power systems, are nominally equal.

The enhancement-mode controller may include an output voltage sensor for delivering an error signal indicative of the first operating frequency; a switch controller for triggering the onset of energy transfer cycles in the zero-current switching converter, the energy transfer cycles being started and terminated by the switch controller at times of zero-current; and a timer for selectively setting the actual operating frequency to be the greater of the first operating frequency or the second operating frequency, the timer delivering a series of trigger pulses to the switch controller at a frequency corresponding to the actual operating frequency, the switch controller triggering an energy transfer cycle in the zero-current switching converter in response to each trigger pulse. The output voltage sensor may include a pair of series connected resistors connected as a voltage divider across the output power port, a reference voltage source, and an error amplifier, an input of the error amplifier being connected between the pair of series connected resistors and the other input being connected to the reference voltage source, the error amplifier delivering an error voltage output indicative of the error signal; the error voltage output increases if the value of the voltage delivered to the error amplifier by the pair of series connected resistors is less than the reference voltage source, and the error voltage output decreases if the value of the voltage delivered to the error amplifier by the pair of series connected resistors is greater than the reference voltage source.

The timer includes a pulse generator for delivering the trigger pulses to the switch controller; a timer capacitor; a current generator connected in series with the timing capacitor for delivering a charging current proportional to the error signal to the timing capacitor; a discharge switch connected in parallel with the timing capacitor, said discharge switch being opened and closed in response to a discharge signal delivered by the pulse generator; a threshold voltage source; a comparator which compares the value of the voltage across the timing capacitor to the value of the threshold voltage source and delivers a threshold signal output to the pulse generator whenever the capacitor voltage becomes equal to or is greater than the threshold voltage source; a receiver reference voltage source; a control port receiver which connects to the input port and which delivers a momentary input trigger pulse to the pulse generator whenever the value of voltage at the input port exceeds the value of the receiver reference voltage source; an output port voltage source; a current limiter connected in series with the output port voltage source; and a port switch connected between the output port and the current limiter, the port switch delivering an output signal to the output port whenever the port switch is closed, the port switch being opened and closed in response to a port switch signal delivered by the pulse generator. The trigger pulse, the port switch signal and the discharge signal are delivered at essentially the same time in response to the presence of the threshold signal or the momentary input trigger pulse, provided that the energy transfer cycle is not in progress in the zero-current switching converter, and provided that conditions within the zero-current switching converter are conducive to initiation of another energy transfer cycle within the zero-current switching converter.

In preferred embodiments, the bidirectional coupling devices and the array coupling devices would include devices which provide static voltage isolation, e.g., capacitors.

The invention provides an array topology which more closely approaches the ideal combination of synchronous operation of power converters, inherent power sharing between converters, and structural and operational symmetry. By symmetry we mean that: all power converter modules which form the array would be of the same kind; any of the power converter modules in the array could become the master controller for the array; mastership would be invoked automatically and transparently by one of the converters in the array; all converters in the array would operate synchronously; each power converter module in the array would supply a constant fraction of the total power delivered to the load; and symmetrical operation of the array would continue if any of the converter modules comprising the array ceased to operate, provided only that the power drawn by the load did not exceed the sum of the power ratings of the balance of the modules which comprise the array.

Other advantages and features will become apparent from the following description of the preferred embodiment and from the claims.

DESCRIPTION OF THE PREFERRED EMBODIMENT

We first briefly describe the drawings.

STRUCTURE AND OPERATION

Figure 1:
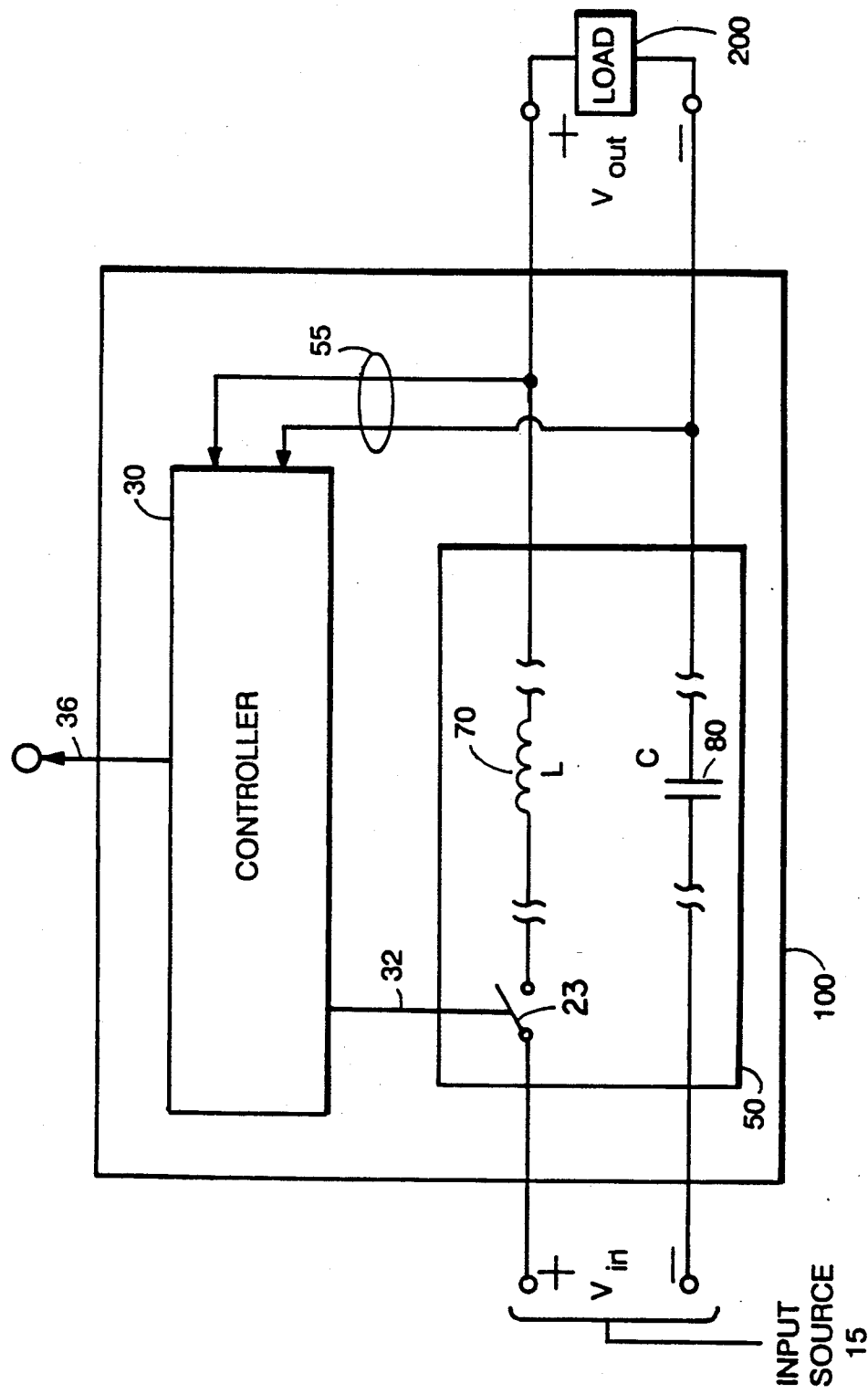
FIG. 1 is a block diagram of an enhancement-mode converter module.

FIG. 1 is a block diagram of a DC to DC converter module 100 which converts power from a source 15, at an input voltage Vin, for delivery to a load 200, at an output voltage Vout. The converter module 100 includes a zero-current switching converter 50 connected between the input source 15 and the load 200; and a controller 30. An input-output control port 36 carries synchronizing information into and out of the converter module 100.

The zero-current switching converter 50 is of the type which delivers power to the load in a series of quantized energy transfer cycles (for example, the forward, single ended type disclosed in Vinciarelli, U.S. Pat. No. 4,415,959, incorporated herein by reference, or a series resonant converter, or other resonant converters). The converter 50 is characterized by the values of an effective inductance 70, L, and a capacitance 80, C, which define a characteristic time scale, $\pi\sqrt{(L*C)}$, for the energy transfer cycles. An output 32 from the controller 30 delivers switching signals to switching devices in the zero-current switching converter 50 (one such switching device 23 is shown). By closing and opening the switching device 23 at times of essentially zero current flow, a finite amount of energy is transferred from the input source 15 to the load 200. Varying the rate at which the switching device 23 is opened and closed (i.e., the actual operating frequency) varies the amount of power delivered to the load 200.

At any given time, converter module 100 operates in one of two modes (driver mode or booster mode) characterized by the way in which it controls the actual operating frequency of the zero-current switching converter 50. As shown in FIG. 1, the load voltage, Vout, is delivered as an input to the controller 30 via the sense connections 55. By comparing the load voltage to a reference voltage (not shown in the FIG.) indicative of some desired setpoint value of load voltage, Vsp, the controller 30 will seek to adjust the actual operating frequency to a frequency value which will maintain the load voltage equal to the setpoint value. If the load voltage is below Vsp, the controller 30 will seek to increase the actual operating frequency; if the load voltage is above Vsp, the controller 30 will seek to decrease the actual operating frequency. Synchronizing information may also be delivered as an input to the controller 30 via the input-output port 36. The controller 30 adjusts the actual operating frequency to the greater of two values:

1. a frequency value, Freg, which will maintain the load voltage, Vout, equal to a desired setpoint value, Vsp. When operating in this mode, the converter module 100 is said to be operating in driver mode;

2. a frequency value, Fsynch, which is indicated by an input delivered to the input-output port 36. When operating in this mode the converter module 100 is said to be operating in booster mode.

Said another way, the controller 30 accepts two inputs, each input being indicative of an intended operating frequency, and selectively controls the actual operating frequency of the zero-current switching converter 50 to correspond to the one of the two indicated frequencies which will maximize the power output of the converter 50.

The controller 30 delivers an output indicative of this selected actual operating frequency to the input-output port 36 for possible use in other modules.

A controller which operates in the manner described above is called an enhancement-mode controller. A converter module 100 comprising a zero-current switching converter 50 having a characteristic time scale $\pi\sqrt{(L*C)}$, an enhancement-mode controller 30, and an input-output port 36 for carrying synchronizing information into and out of the controller 30, is called an enhancement-mode converter module. If a single enhancement-mode converter module 100 is connected between a source 15 and a load 200, as shown in FIG. 1, and no synchronizing information is delivered as an input to the input-output port 36, then the enhancement-mode converter module 100 will maintain the load voltage in regulation, at a value equal to the setpoint voltage Vsp, as the values of either or both the input source 15 and the load 200 vary.

Figure 2:
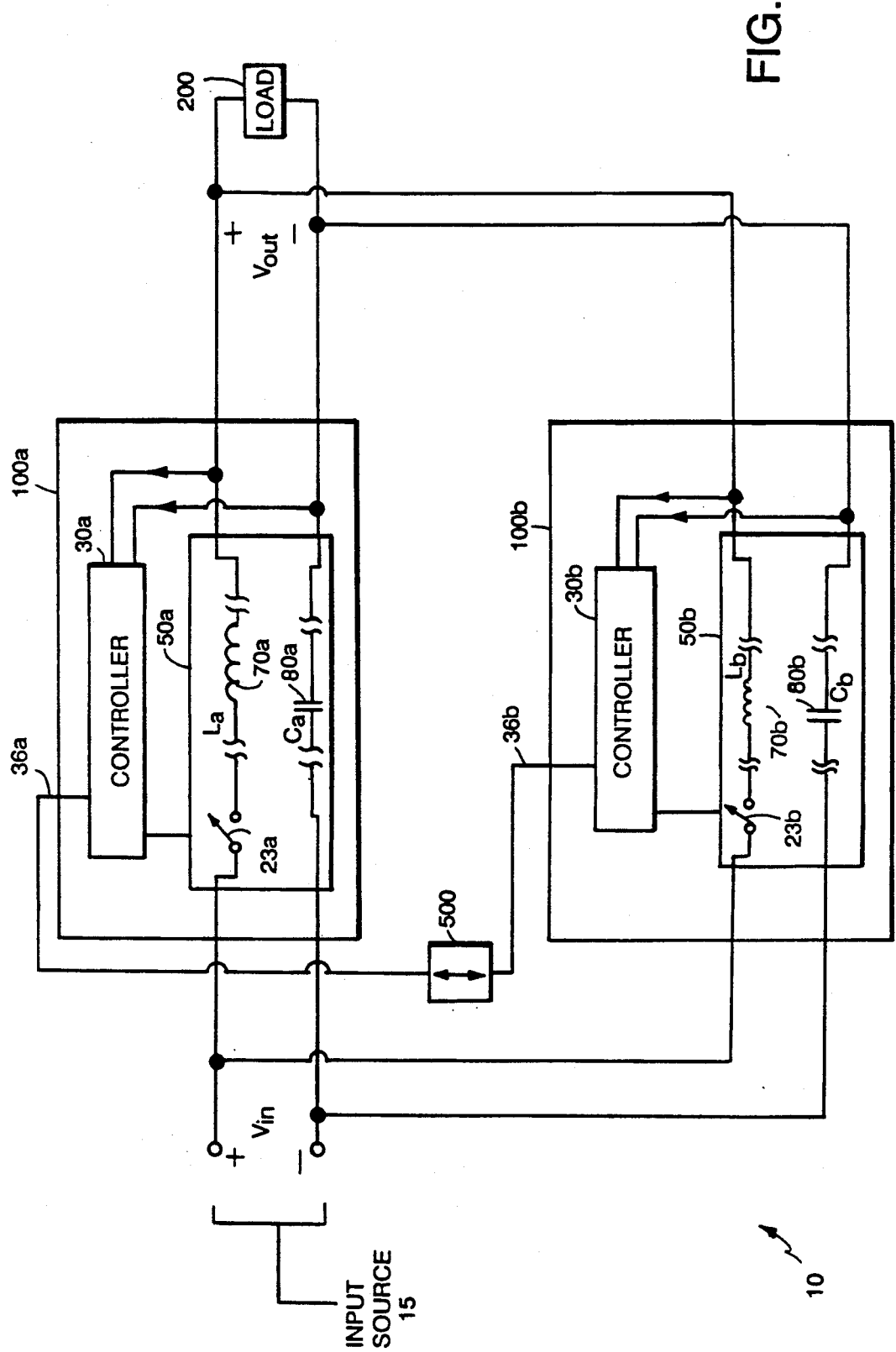
FIG. 2 is a block diagram of a power conversion array comprising two enhancement-mode converter modules.

FIG. 2 shows an array 10 of two enhancement-mode converter modules 100a, 100b which delivers power from an input source 15, of voltage Vin, to a load 200. The characteristic time scales of the two converter modules 100a, 100b are, respectively, $\pi\sqrt{(La^*Ca)}$ and $\pi\sqrt{(Lb^*Cb)}$, and are essentially equal. The input-output ports 36a, 36b of the two converter modules 100a, 100b are connected together by a bidirectional coupling device 500 which provides for bidirectional flow of synchronizing information between the ports 36a, 36b. The setpoint voltages of the converter modules 100a, 100b are, respectively, Vspa and Vspb. Both converter modules 100a, 100b will operate synchronously at an actual operating frequency determined by the controller in the converter module with the higher setpoint voltage. The power delivered to the load will be shared by the two converter modules 100a, 100b in a ratio corresponding to the ratio of the amounts of energy that the converter modules respectively deliver during each energy transfer cycle.

In further explanation of the operation of the array, assume, for example, that converter module 100a has the higher setpoint voltage (i.e. Vspa>Vspb), and that the load voltage is at a value which is between the setpoint voltages of the two converter modules 100a, 100b (i.e. Vspa>Vout>Vspb). Converter 100a will sense that the load voltage is below its setpoint voltage, Vspb, and seek to increase its operating frequency. Converter 100b will sense that the load voltage is above its setpoint voltage, Vspb, and will seek to decrease its operating frequency. However, the enhancement-mode controller 30b in converter module 100b will in fact adjust the operating frequency of converter module 100b to correspond to the higher frequency synchronizing information that it is receiving at its input-output port 36b, via the bidirectional coupling device 500, from controller 100a. As a result, converter module 100a will operate in driver mode, converter module 100b will operate in booster mode, and both of the zero-current switching converters 50a, 50b, included in converter modules 100a, 100b, respectively, will operate synchronously at an operating frequency determined by the enhancement-mode controller 30a in converter module 100a. In the array 10 of FIG. 2 the converter module which is operating in driver mode is referred to as a master, and the converter module which is operating in booster mode is referred to as a slave.

Figure 3:
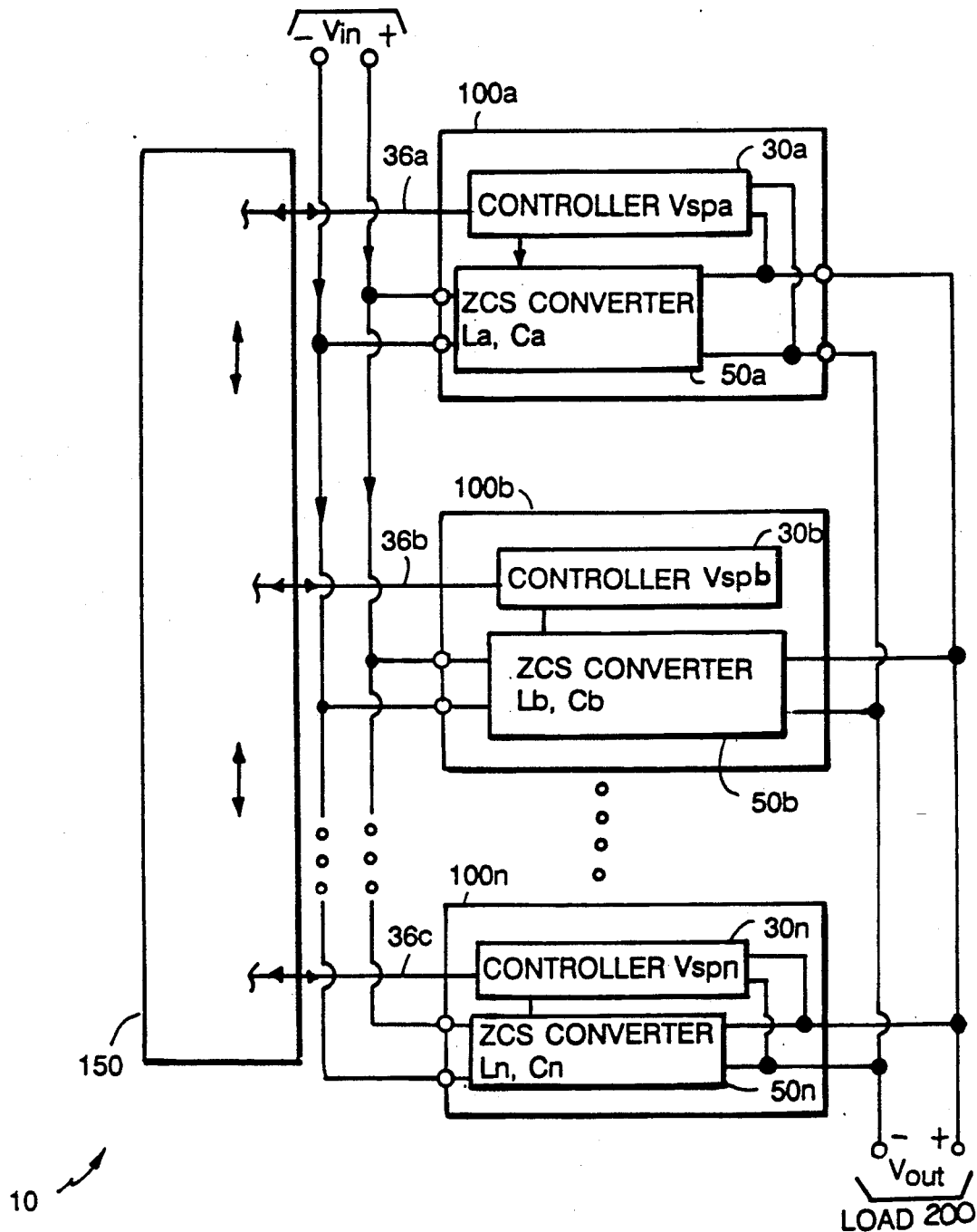
FIG. 3 is a block diagram of a power conversion array comprising a plurality of enhancement-mode converter modules and a synchronizing bus.

As shown in FIG. 3, the array of FIG. 2 can be extended to include more than two enhancement-mode converter scales of the converter modules 100a, 100b, ..., 100n are, respectively, $\pi\sqrt{(La^*Ca)}$, $\pi\sqrt{(Lb^*Cb)}$, ..., $\pi\sqrt{(Ln^*Cn)}$, and are essentially equal. The input-output ports 36a, 36b, ..., 36n of the converter modules 100a, 100b, ..., 100n are connected to a synchronization bus 150. Synchronizing information delivered to the synchronization bus 150 by any of the converter modules 100a, 100b, ..., 100n is propagated in both directions along the bus for delivery to other converter modules. The setpoint voltages of the converter modules 100a, 100b, ..., 100n are, respectively, Vspa, Vspb, ..., Vspx. By an argument similar to that given for the array of FIG. 2, all converter modules 100a, 100b, ..., 100n in the array 10 of FIG. 3 will operate synchronously at a frequency determined by the controller 30a, 30b, ..., 30n having the highest setpoint voltage, and the fraction of the power delivered to the load by each converter module 100a, 100b, ..., 100n will be the ratio of the amount of energy that each converter module delivers during each energy transfer cycle to the total of all energy transferred during each cycle by all converters. The converter module 100a, 100b, ..., 100n in the array 10 of FIG. 3 with the highest setpoint voltage will be the master; all other converter modules will operate as synchronous slaves.

A primary application of the array topology of FIG. 3 is to provide more power to a load 200 (for example, 1000 Watts) than the amount which can be delivered by a single converter module (for example, 200 Watts) at some desired value of output voltage, Vout (for example, 5 Volts). The converter modules 100a, 100b, ..., 100n used in the array 10 would be randomly selected from a population of units which are rated to deliver the same nominal output voltage, Vspx. In practice, due to component tolerances and manufacturing process variations, the actual values of the setpoint voltages Vspa, Vspb, ..., Vspn will vary slightly from converter module to converter module. For example, converter modules rated for 5 Volts might actually exhibit setpoint voltages of 4.995 V, 5.010 V, and other similar values which are within a defined tolerance band relative the nominal rating, Vspx (for example, 5 Volts, +/−0.5%). If all of the enhancement-mode converter modules 100a, 100b, ..., 100n which are included in the array 10 of FIG. 3 have setpoint voltage values Vspa, Vspb, ..., Vspn within a defined tolerance band relative to a nominal output voltage value, Vspx, then the output voltage of the array will also fall within that defined tolerance band relative to the nominal output voltage value, Vspx.

Figure 4:
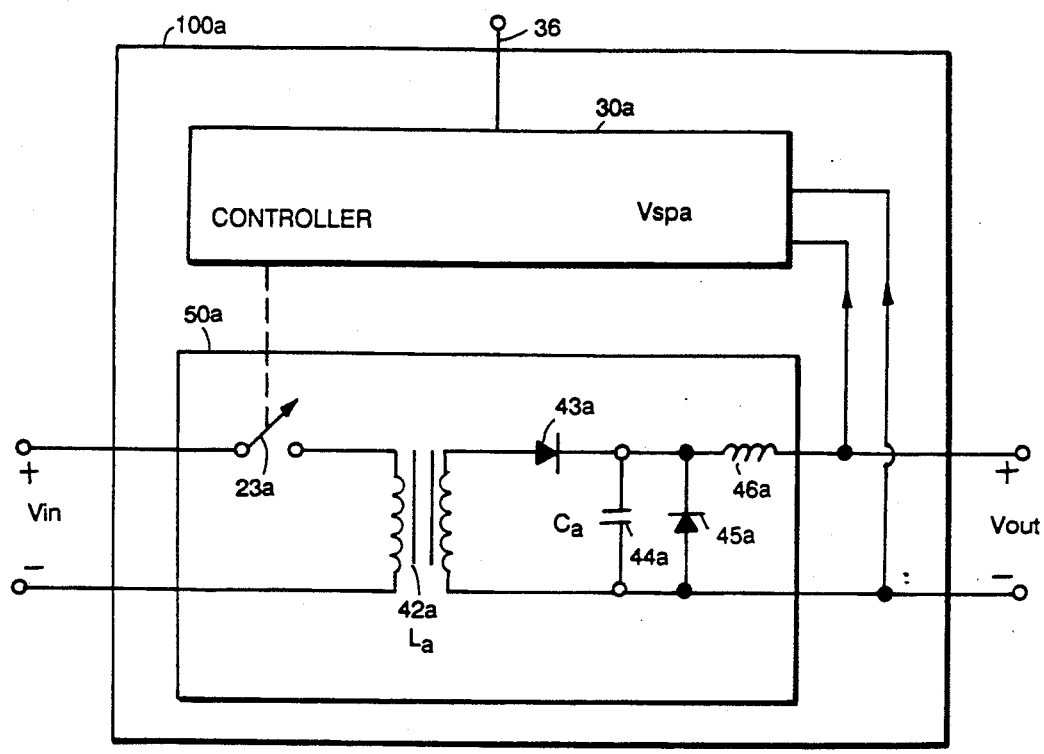
FIG. 4 is a block diagram of an enhancement-mode converter module having a zero-current switching converter of the forward, single ended type.

If all of the converter modules 100a, 100b, ..., 100n in the array of FIG. 3 include a zero-current switching converter 50a, 50b, ..., 50n of the kind described in Vinciarelli, U.S. Pat. No. 4,415,959, and shown for one such converter module 100a in FIG. 4, then the zero-current switching converters 100a, 100b, ..., 100n in FIG. 3 will include, respectively, switches 23a, 23b, ..., 23n; transformers 42a, 42b, ..., 42n; unidirectional conducting devices 43a, 43b, ..., 43n; unidirectional conducting devices 45a, 45b, ..., 45n; capacitors 44a, 44b, ..., 44n; and inductors 46a, 46b, ..., 46n. If the values of the effective secondary leakage inductances of transformers 42a, 42b, ..., 42n are, respectively, La, Lb, ..., Ln, and the values of the capacitors 44a, 44b, ..., 44n are, respectively, Ca, Cb, ..., Cn, and all of the converters 50a, 50b, ..., 50n in FIG. 3 have essentially equal characteristic time scales, $\pi\sqrt{(La^*Ca)}$, $\pi\sqrt{(Lb^*Cb)}$, ..., $\pi\sqrt{(Ln^*Cn)}$, respectively, then each converter module 100a, 100b, ..., 100n will deliver a fraction of the total power to the load 200 equal to the ratio of the value of its capacitor 44a, 44b, ..., 44n to the sum of the values of all of the capacitors 44a, 44b, ..., 44n.

If one or more of the converter modules 100a, 100b, ..., 100n in the array 10 of FIG. 3 ceases delivering power to the load (due, for example, to a failure within the converter module), then the synchronous, power-sharing characteristic of the array 10 will be retained, provided only that the value of the load does not exceed the sum of the power ratings of the remaining operating converter modules in the array. If a slave converter module ceases to operate, the master will smoothly increase the operating frequency of the array so that the load power is delivered by the remaining converters. If the master ceases to operate, the load voltage will decline and the converter module having the highest setpoint voltage of the remainder of the operating converters included in the array will smoothly become the master. Thus, the array 10 of FIG. 3 is inherently fault-tolerant relative to failure of one or more of the converter modules 100a, 100b, ... 100n which are included in the array.

Figure 5:
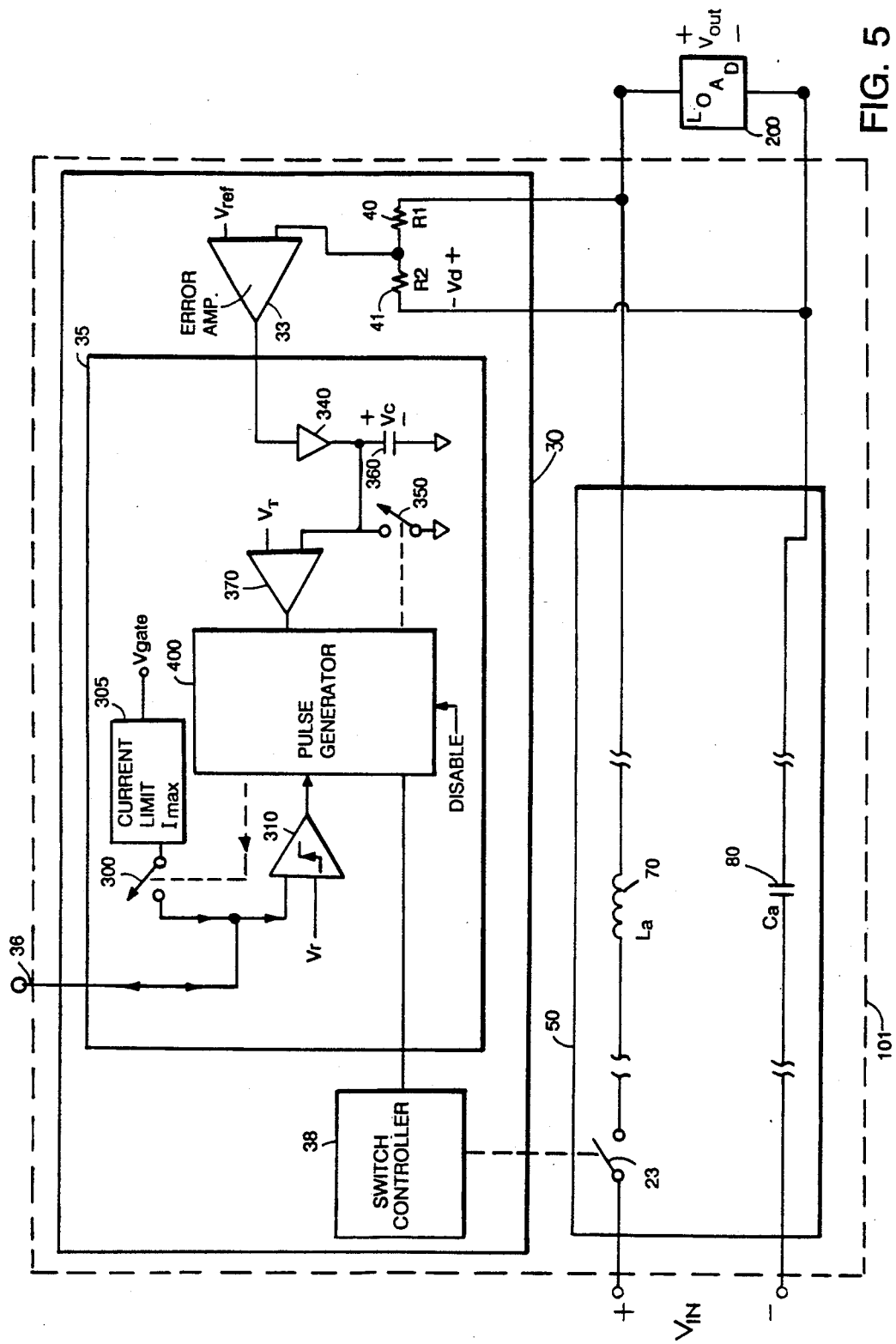
FIG. 5 is a block diagram of an enhancement-mode converter module including a circuit diagram of an enhancement-mode controller.

FIG. 5 shows an enhancement-mode converter module 101 and details of an enhancement-mode controller 30. An error amplifier 33, included in controller 30, compares the voltage, Vd, that appears between series connected resistors 40, 41, to a reference voltage, Vref, and delivers a corresponding output to a timer 35. If Vd is greater than Vref, the output of the error amplifier will go lower; if Vd is less than Vref the output of the error amplifier will go higher. The values of the resistors, R1 and R2, and the value of the reference voltage, Vref, define a setpoint voltage for the controller as:

$$V_{sp} = \frac{R1 + R2}{R2} \cdot V_{ref} \quad (1)$$

The timer 35 is connected to a switch controller 38 which causes the switch 23 to turn on and off at times of essentially zero current. A current generator 340, included in the timer 35, delivers a current, which is proportional to the error amplifier 33 output, to a timing capacitor 360. A discharge switch 350 is connected across the capacitor. A comparator 370 compares the voltage, Vc, across the capacitor 360 to a threshold voltage Vt. The output of the comparator is delivered to a pulse generator 400, which generates timer output pulses for delivery to the switch controller 38, and which closes port switch 300 to deliver an output to the input-output port 36. When the port switch 300 is closed, a voltage source, of value Vgate (which might be 10 volts), is connected to the input-output port 36 through a current limiter 305. The current limiter 305 limits current flowing out of the input-output port 36 to a value Imax (which might be a few milliamperes). The pulse generator also receives an input from the control port receiver 310. One input of the control port receiver 310 is connected to the input-output port 36 and the other input is connected to a receiver reference voltage of value Vr. If the voltage level of a synchronizing signal arriving at the input-output port 36 is greater than the value of the receiver reference voltage, current will flow into the receiver 310 input and the receiver 310 will deliver a momentary trigger input to the pulse generator 400. Whenever a timer output pulse is generated by the pulse generator 400 a pulse is generated which closes the port switch 300, an energy transfer cycle is initiated in the converter 50 (via the switch controller 38), and the disable signal input to the pulse generator 400 is asserted. The disable signal remains asserted until the energy transfer cycle is complete and the converter 50 is able to initiate another cycle. Whenever the disable input is asserted, generation of timer output pulses by the pulse generator 400 is inhibited.

Figure 6:
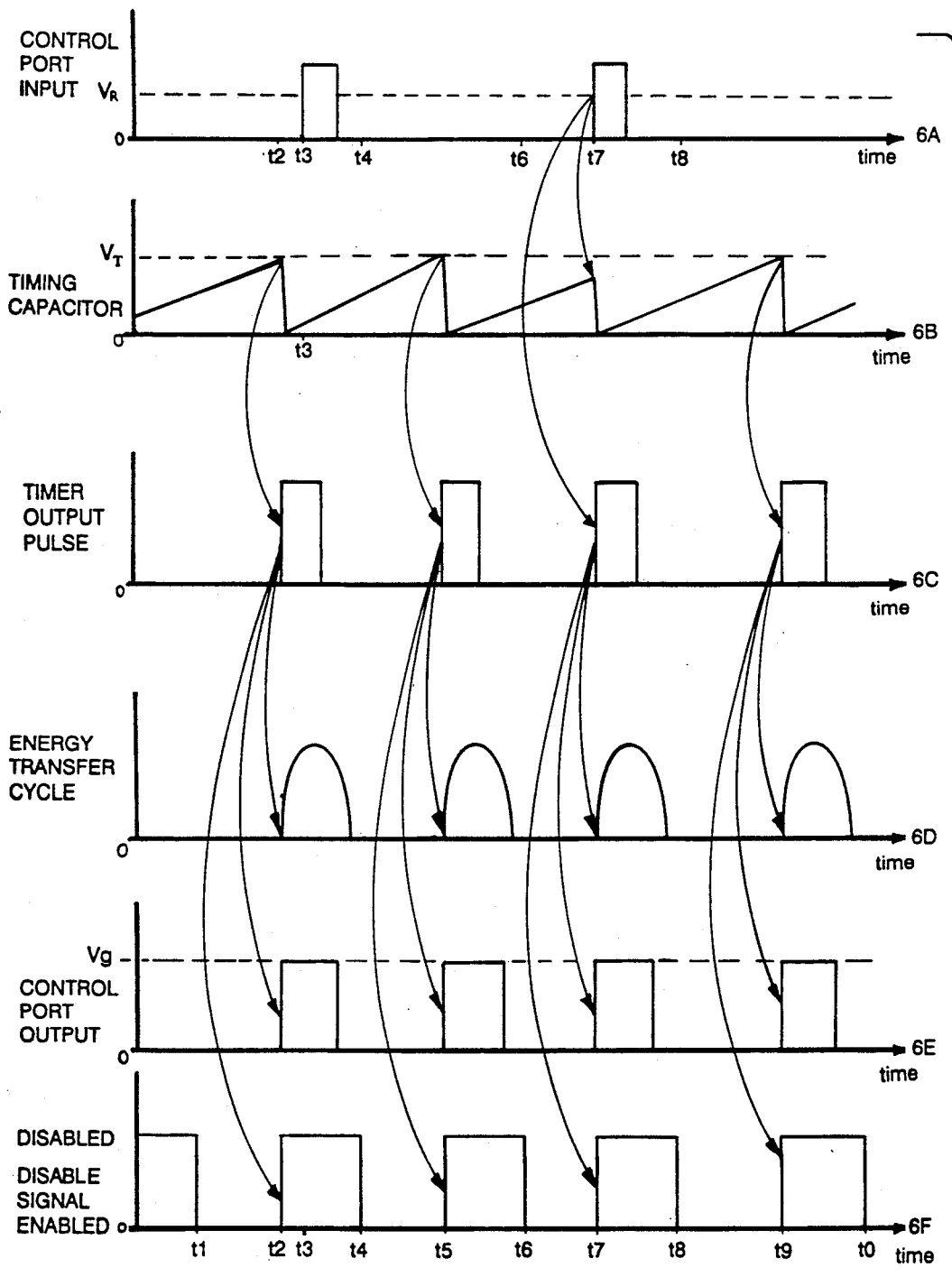
FIGS. 6A through 6F are timing diagrams for the enhancement-mode converter module of FIG. 5 in operation.

FIG. 6 shows the operation of the timer 35 of FIG. 5. At time t1 the disable signal (FIG. 6F) goes low, indicating that the converter 50 is able to initiate another energy transfer cycle. At time t2, the capacitor 360 voltage (FIG. 6B) reaches the threshold voltage, Vt, and the comparator 370 delivers a signal to the pulse generator 400 which responds by generating a timer output pulse (FIG. 6C), closing the port switch 300 (FIG. 6E), asserting the disable signal (FIG. 6F), and momentarily closing the discharge switch 350 across the capacitor (which causes the capacitor 360 to discharge (FIG. 6B)). The timer output pulse initiates an energy transfer cycle in the converter 50 (FIG. 6D). After discharging at time t2, the voltage across the capacitor 360 again starts to ramp up in response to the current which is output by the current generator 340. At time t4, after the energy transfer cycle is completed and the converter 50 is able to initiate another cycle, the disable signal is deasserted (FIG. 6F).

During the energy transfer cycle, at time t3, an input is shown arriving at the input-output port 36 (FIG. 6A). Because this signal arrives at a time when the disable signal is asserted, it is ignored by the pulse generator. At time t5, the capacitor 360 voltage again reaches the threshold voltage, Vt, causing the comparator 370 to again deliver a signal to the pulse generator 400, which once more responds by generating a timer output pulse (FIG. 6C), closing the port switch 300 (FIG. 6E), asserting the disable signal (FIG. 6F), and momentarily closing the discharge switch 550 across the capacitor (which causes the capacitor 360 to discharge (FIG. 6B)). An energy transfer cycle is initiated in response to the timer output pulse (FIG. 6D). At time t6 the energy transfer cycle has been completed and the disable signal is deasserted. However, at time t7, prior to the capacitor 360 voltage reaching the threshold voltage, Vt, an input is received at the input-output port 36 (FIG. 6A). This input causes the control port receiver 310 to deliver a trigger input to the pulse generator 400. Since the disable signal was not asserted at time t7, when the pulse was received at the input-output port 36, the trigger input is accepted by the pulse generator 400. This results in a timer output pulse being generated (FIG. 6C), closure of the port switch 300 (which regenerates the pulse which had just been received at the input-output port 36 (FIG. 6E)), assertion of the disable signal (FIG. 6F), discharge of the timing capacitor 360 through momentary closure of the discharge switch 350 (FIG. 6B), and initiation of an energy transfer cycle (FIG. 6D).

Another energy transfer cycle, starting at time t9, is also shown. In the absence of an input at the input-output port 36 (FIG. 6A), the timing of this cycle is determined by the capacitor 360 charging to the threshold voltage Vt.

Each time a cycle ends (i.e. when the disable signal is deasserted at times t1, t4, t6, t8, and t10 in FIG. 6) initiation of another cycle (i.e. generation of another timer output pulse) will occur on the earlier of two events: the timing capacitor 360 charging up to the threshold voltage, or the arrival of an input at the input-output port 36. If no signals are received at the input-output port 36, the relative spacing of timer output pulses will be determined entirely by the error amplifier output, and the converter will operate in driver mode at a frequency Freg. If, however, a pulse train is delivered to the input-output port 36 at a frequency, Fsynch, which is greater than Freg, the operating frequency of the converter will synchronize to Fsynch and operate in a booster mode. If two or more of the converter modules 101 shown in FIG. 5 are connected in an array 10, as shown in FIG. 3, the array 10 will synchronize to a frequency which is determined by the converter module having the highest setpoint voltage, Vsp (Equation 1).

Figure 7:
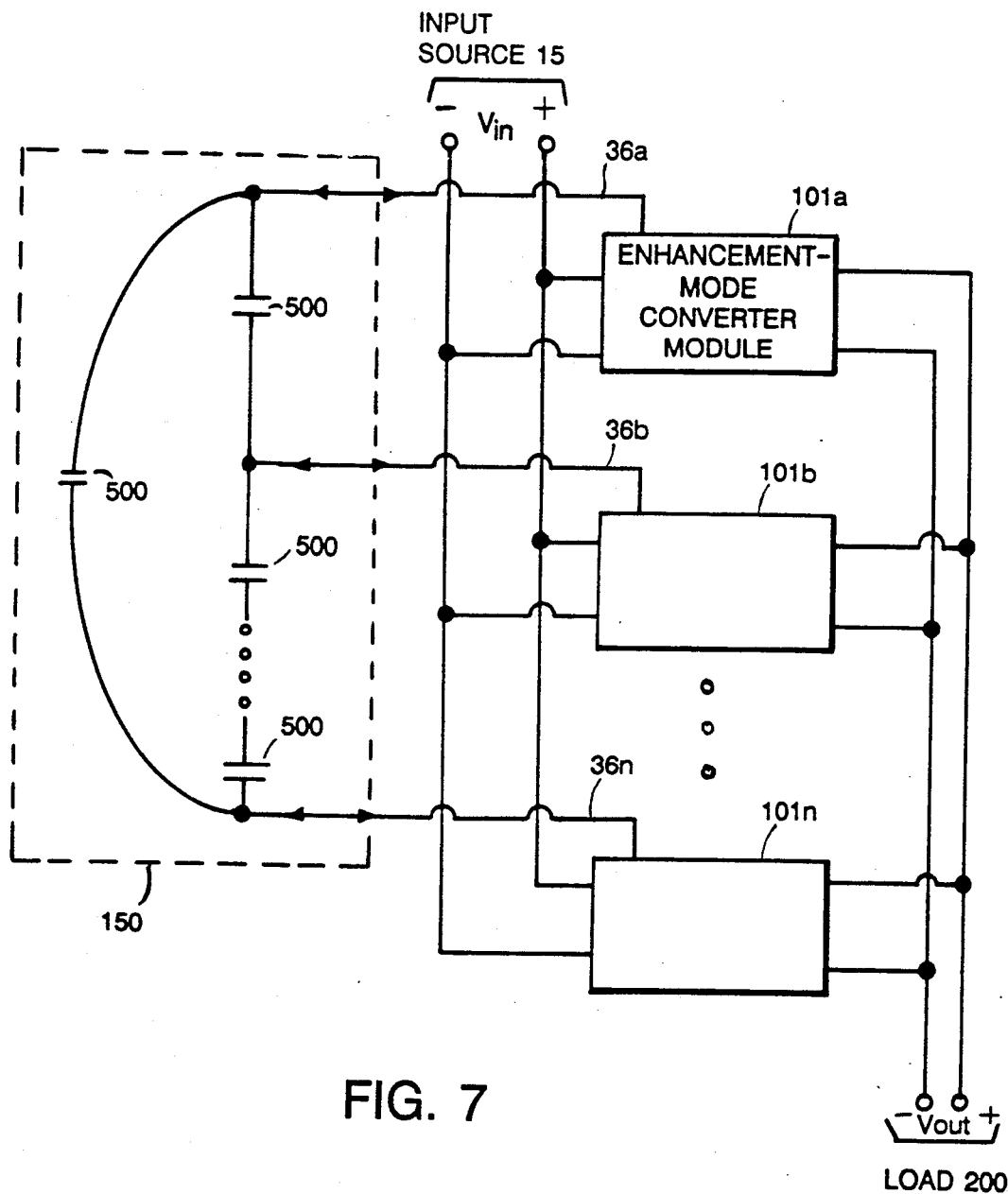
FIG. 7 is a block diagram of a fault-tolerant array of enhancement-mode converter modules, including a synchronizing bus comprising capacitors.

A synchronizing bus 150 that is useful for constructing arrays of converter modules of FIG. 5 is shown in FIG. 7. In FIG. 7, all of the bidirectional coupling devices 500 are capacitors which are serially connected to form a ring. The connections between capacitors 500 are points to which converter module input-output ports 36a, 36b, . . . , 36n are connected.

The array of FIG. 7 exhibits fault-tolerant characteristics relative to failure of both the converter modules 101a, 101b, . . . , 101n and the synchronizing ring 150 which comprise the array.

Figure 8A:
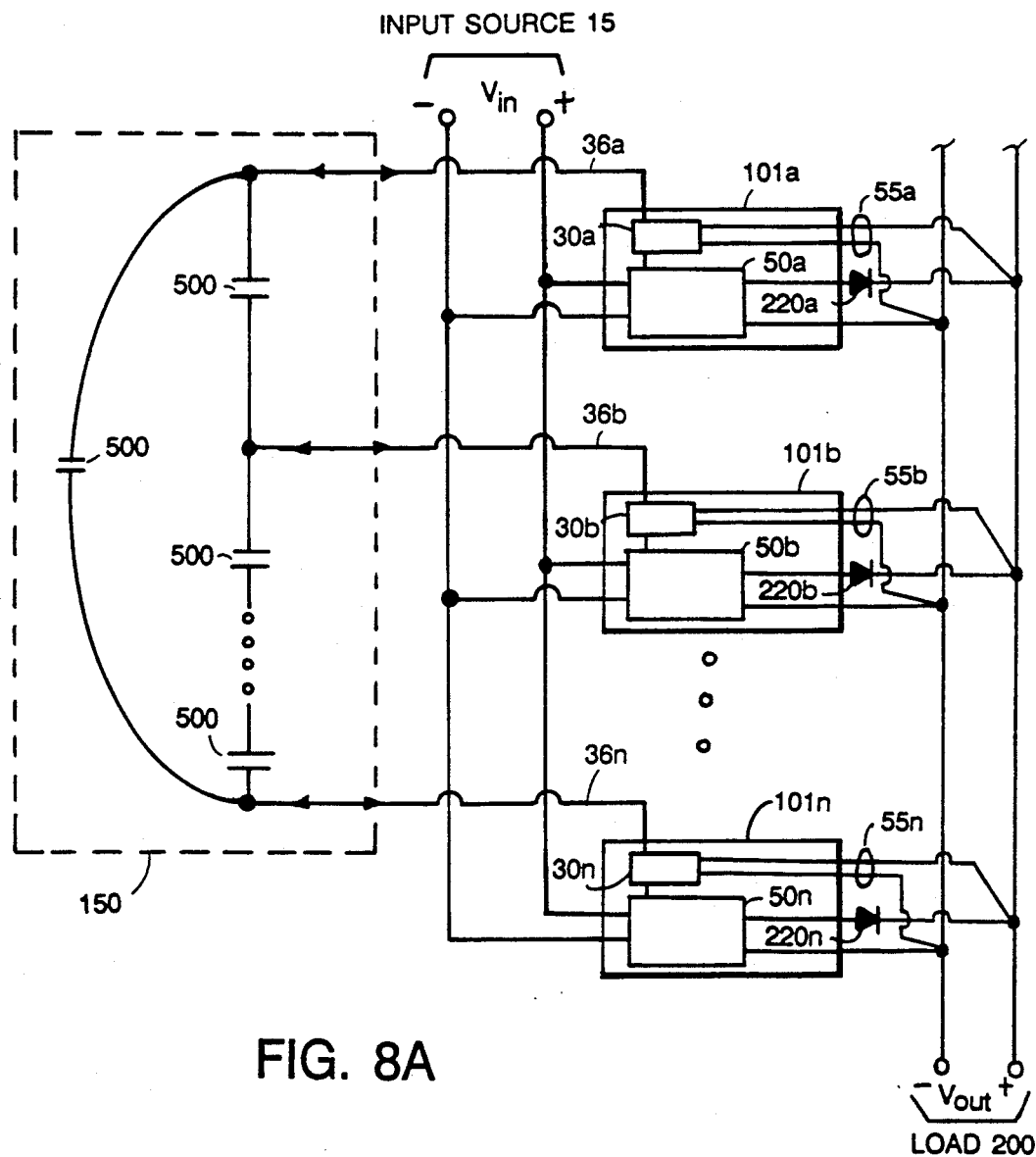
FIGS. 8A and 8B are block diagrams which show the use of OR'ing diodes at the outputs of enhancement-mode converter modules and the use of a sense bus for measuring load voltage.
Figure 8B:
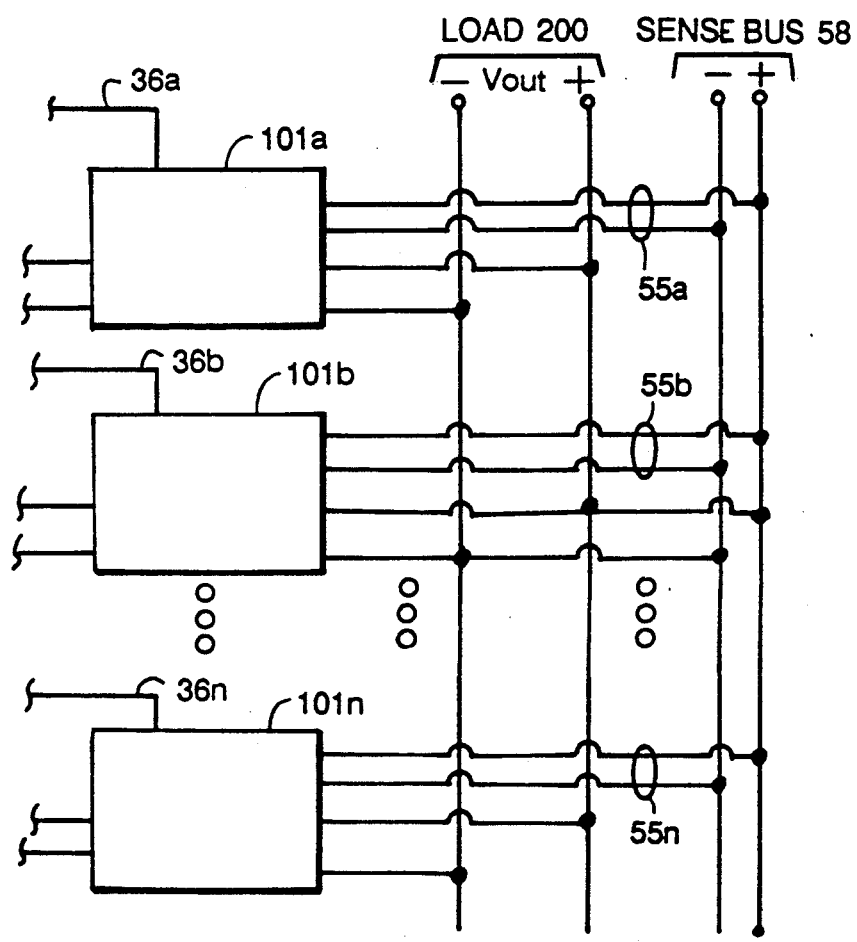

With respect to failure of converter modules, as previously discussed, the synchronous, power-sharing characteristic of the array will be retained if one or more of the converter modules 101a, 101b, . . . , 101n in the array ceases delivering power to the load, provided only that the value of load does not exceed the sum of the power ratings of the remainder of the operating converter modules included in the array. In an actual system, however, an output short (i.e. an internal short circuit between the output terminals of any one of the converter modules in the arrays of FIGS. 2, 3, or 7) could interrupt operation of the entire array. One way of preventing this array failure mode, as shown in FIG. 8A, is to connect an "OR'ing diode" 220a, 220b, . . . , 220n between the output of each of the zero-current switching converters 50a, 50b, . . . , 50n (included in each of the converter modules 101a, 101b, . . . , 101n) and the load. When OR'ing diodes are used in this way, the voltage sense connections 55a, 55b, . . . , 55n of the enhancement mode controllers 30a, 30b, . . . , 30n must be brought out of the converter module for connection to the load side of the OR'ing diodes. These "sense leads" are generally useful in practical power systems, whether or not OR'ing diodes are used, in that they provide a means for regulating the voltage at a physically remote load and also allow for single-point sensing of load voltage in systems where both the converters and the load may be physically distributed. For example, in FIG. 8B, which shows a portion of an array, the sense connections 55a, 55b, . . . , 55n of all converters 101a, 101b, . . . , 101n are connected to a "sense bus" 58 which measures the load voltage at a single point in the system (in the FIG. the sense bus 58 is shown connected to the output of converter module 101b). The sense bus 58 ensures that all converters measure essentially the same value of load voltage.

With respect to failure of the bus in FIGS. 7 or 8, since synchronizing pulses can propagate in both directions along the synchronizing bus 150, synchronizing information from any converter port 36a, 36b, . . . , 36n will continue to be delivered to all other ports even if an open circuit develops along the bus 150 (for example, if one of the capacitors 500 develops an open circuit). Static faults, such as shorting of a point on the synchronizing bus 150 to a terminal of the input source 15, or appearance of elevated voltage at an input-output port 36a, 36b, . . . , 36n due to a catastrophic failure internal to a converter module, will be blocked by the capacitors 500 which comprise the synchronizing bus 150, and will not propagate statically along the bus.

Figure 9:
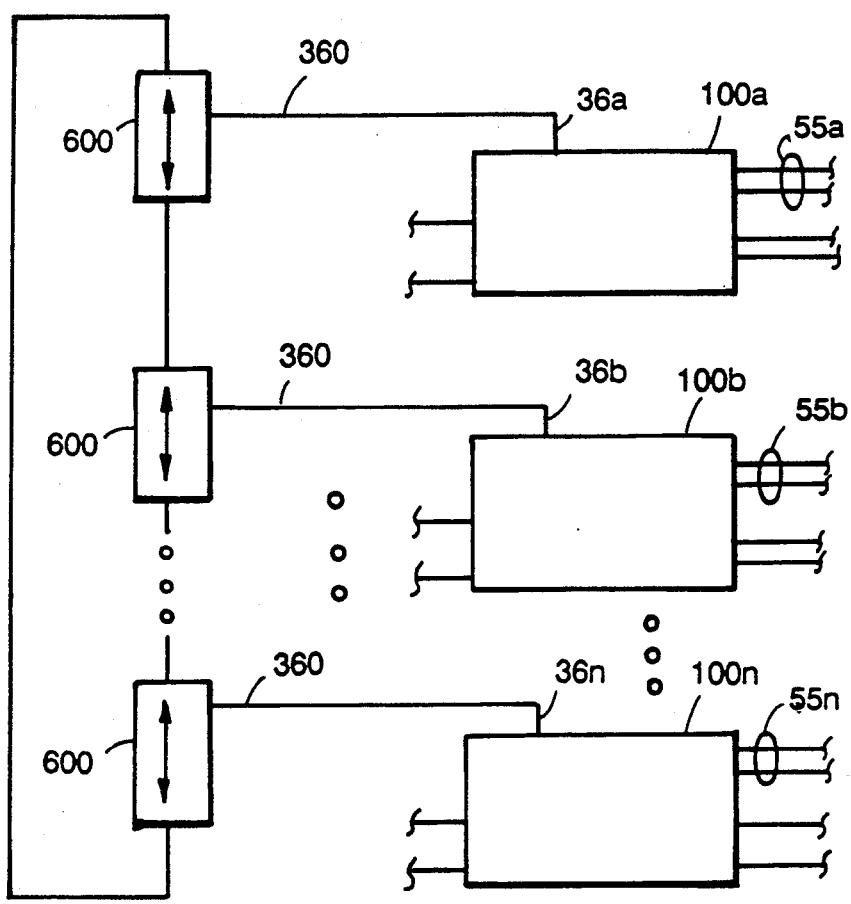
FIG. 9 is a block diagram which shows a generalized synchronizing bus structure.

In FIG. 9, the structure of the synchronizing bus 150 of FIGS. 3 and 7 is generalized to comprise a plurality of series connected bidirectional coupling devices 600, each of which includes a signal port 360 for connection to the input-output port 36a, 36b, . . . , 36n of one of the enhancement-mode converter modules 100a, 100b, . . . , 100n. Synchronizing information delivered to the signal port 360 of any of the bidirectional coupling devices 600 via the input-output port 36a, 36bn, . . . , 36n of any of the enhancement-mode converter modules 100a, 100b, . . . , 100n propagates in both directions along the synchronizing bus 150 for delivery to other converter modules. Specific implementations of the bidirectional coupling devices 600 of FIG. 9 would depend on how the controller is implemented, the media chosen for carrying synchronizing information (e.g. electrical, optical), the encoding scheme used for propagating synchronizing information along the bus and to and from the signal ports (e.g. analog, pulse train, or parallel or serial encoding as digital data), and the degree of fault tolerance desired in the application. Fault tolerant buses would generally include devices which provide static voltage isolation (e.g. capacitors, optical coupling devices, transformers).

Figure 10A:
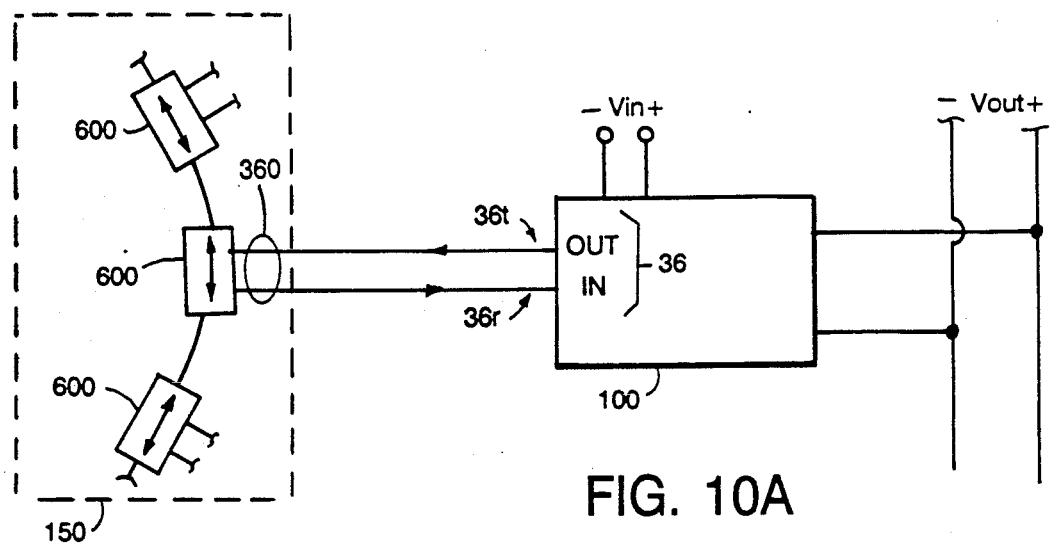
FIGS. 10A through 10C are block diagrams of alternate embodiments.

A variety of topological structures may be used for the input-output port 36 and the synchronizing bus 150. For example, in FIG. 5 the input-output port 36 is a single terminal which bidirectionally transmits and receives synchronizing information. In FIG. 10A, the input-output port comprises separate terminals 36t, 36r for transmission and reception of information. One terminal 36t carries synchronizing information out of the converter module 100 and another terminal 36r carries synchronizing information into the module 100. The two terminals 36r, 36t are shown connecting to separate input and output ports of a bidirectional coupling device 600 which forms a portion of the synchronizing bus 150. The input-output port of FIG. 5 can be adapted to the structure of FIG. 10A by elimination of the connection between the port switch 300 (FIG. 5) and the control port receiver 310, and reconnection of the port switch 300 to a separate terminal.

Figure 10B:
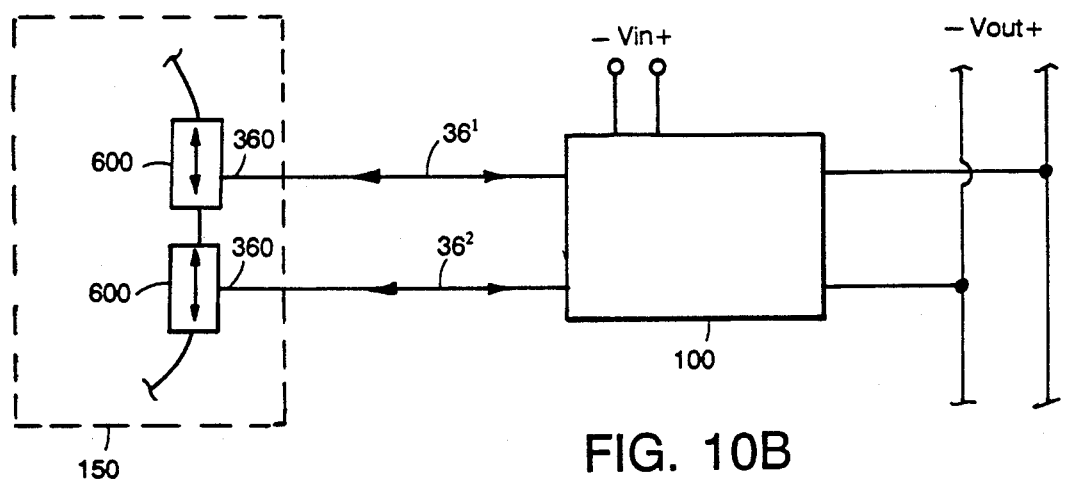

In FIG. 10B, a converter module 100 includes two "redundant" input-output ports 36/1, 36/2, which may be of the bidirectional kind shown in the FIG., or which may be of the kind shown in FIG. 10A (comprising separate input and output ports).

Figure 10C:
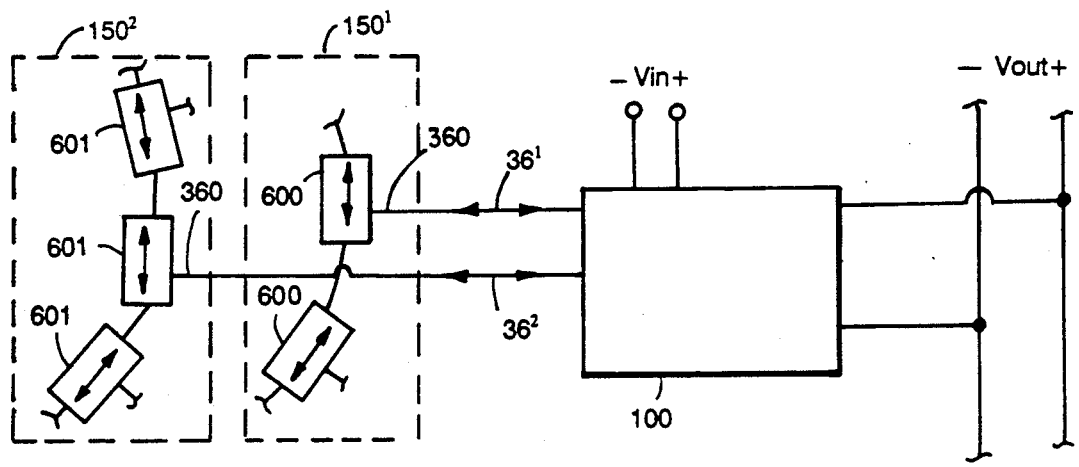

In FIG. 10C, a converter module 100, which includes two input-output ports 36/1, 36/2, is connected to two independent synchronizing buses 150/1, 150/2 (a portion of each being shown to include bidirectional coupling devices 600, 601). In other embodiments the converter modules could include more than two redundant input-output ports, of the kinds shown in FIGS. 10A or 10B, and these redundant input-output ports could connect to more than two independent synchronizing buses. These, and other topological variations, exhibit differing degrees of complexity and fault-tolerance.

Figure 11:
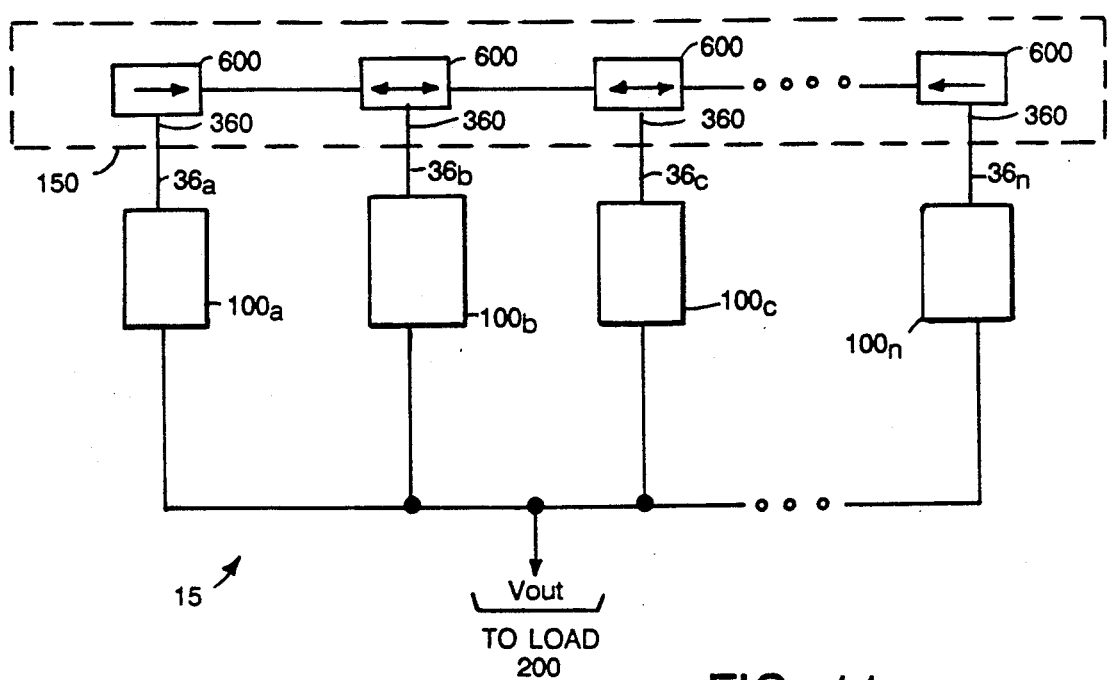
FIG. 11 is a block diagram showing a serial synchronizing bus.

The synchronizing bus which interconnects converter module input-output ports need not be a ring structure (e.g. as in FIGS. 7, 8). For example, FIG. 11 shows a power conversion array 15 wherein the input-output ports 36a, 36b, 36c, . . . , 36n of enhancement-mode converter modules 100a, 100b, 100c, . . . , 100n are connected by a synchronizing bus 150 comprising a set of serially connected coupling devices 600 (for clarity, input voltage sources are not shown in the Figure).

Figure 12:
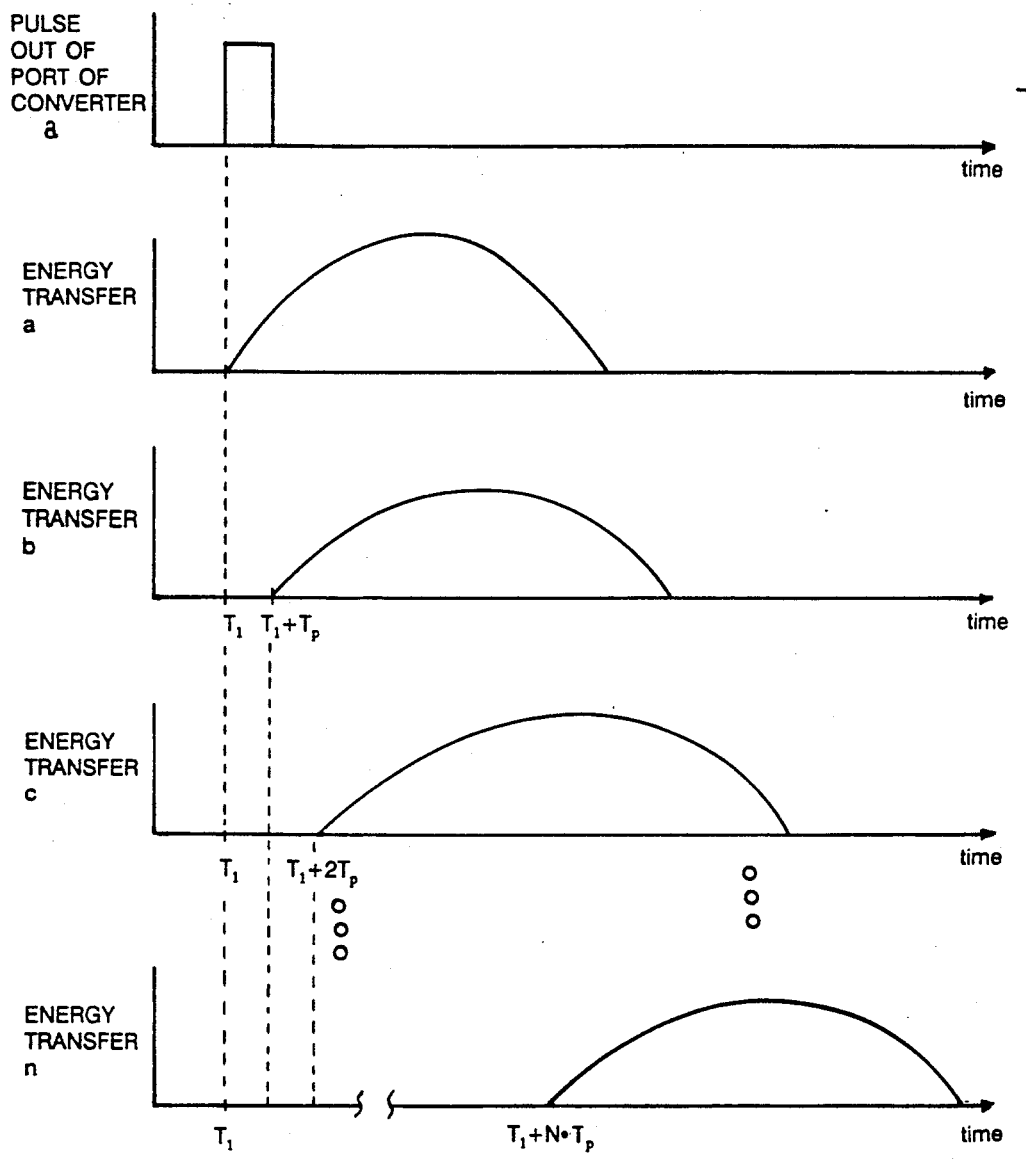
FIG. 12 shows the relative timing of the energy transfer cycles in each of the converters included in an array of the kind shown in FIG. 7.

There is an upper limit on the number of converter modules which can be used in arrays of the kind shown in FIG. 7. Any pulse generated at converter 101a will eventually propagate along the entire length of the synchronizing bus 150, be regenerated by converter module 101n and arrive back at converter module 101a. This is illustrated in FIG. 12, where the propagation delay from converter to converter is Tp. Converter module 101n is shown starting its energy transfer cycle at a time N*Tp after the beginning (T1) of the energy transfer cycle of converter 101a. The pulse generated by converter 101n will arrive back at converter 101a Tp seconds later. Thus, in a ring of N converters, a pulse originally generated at converter 101a reappears at the converter (N+1)*Tp seconds later. If this pulse reappears at a time prior to the end of the energy transfer cycle, converter 101a will not retrigger. If, however, the total delay around the synchronizing bus 150, (N+1)*Tp, exceeds the time duration of the energy transfer interval of converter 101a, the pulse will retrigger converter 101a and the array will run away. If the energy transfer cycle lasts 400 nanoseconds, and the value of Tp is 20 nanoseconds, the ring is limited to 20 converters. If each converter can supply 200 Watts, such a ring would be limited to 4000 Watts.

Figure 13:
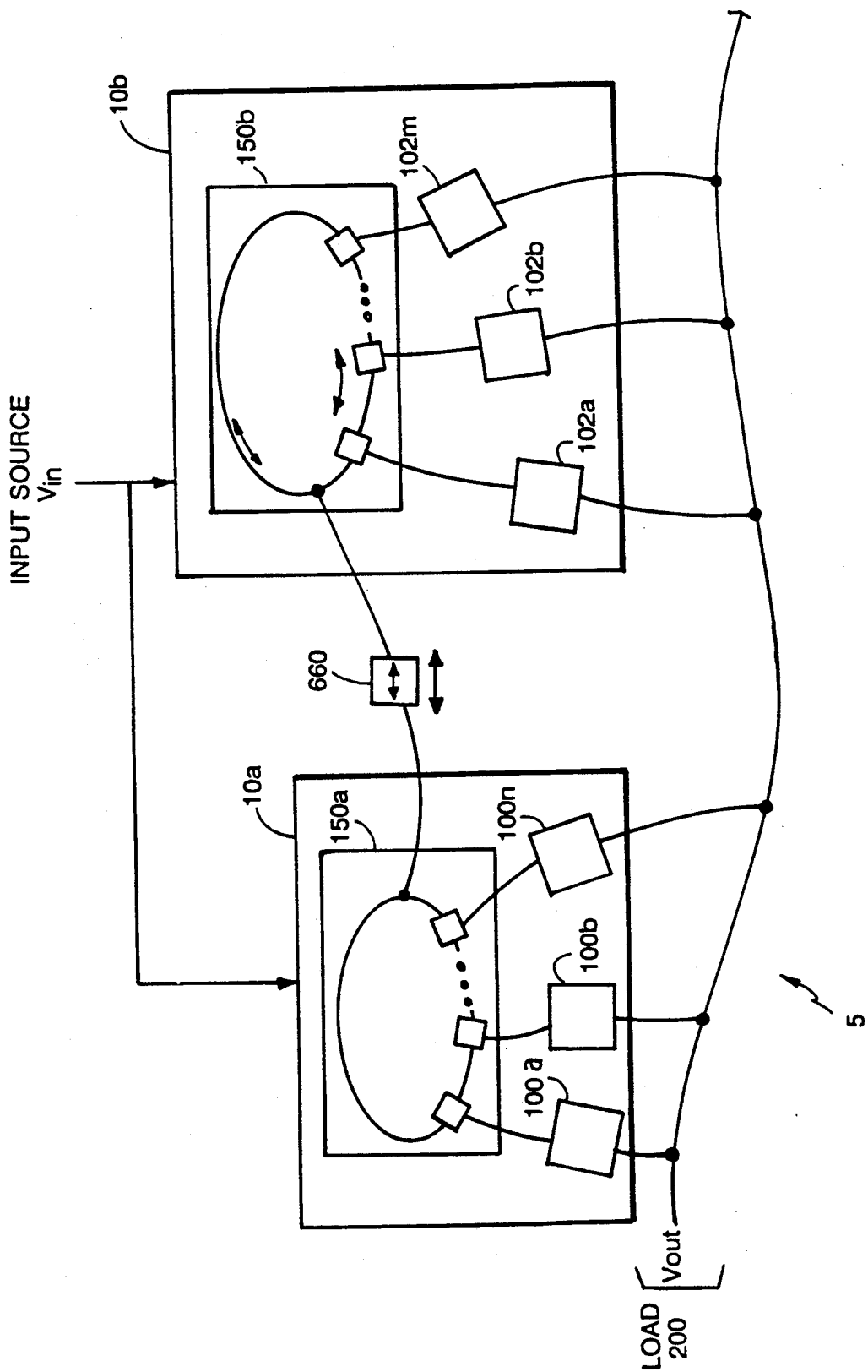
FIG. 13 is a block diagram of two linked power conversion arrays.

Multiple arrays of enhancement-mode converters can be linked, either to provide more power than can be supplied by a single array, or to satisfy physical distribution requirements associated with the load. In FIG. 13, a power system 5 comprises two arrays 10a, 10b including, respectively N and M enhancement-mode converter modules 100a, 100b, . . . , 100n; 102a, 102b, . . . , 102m, and synchronization buses 150a, 150b. The synchronization buses in the two arrays, 150a, 150b are linked via an array coupling device 660 which carries synchronizing signals between the two arrays. All of the converter modules 100a, 100b, . . . , 100n; 102a, 102b, . . . , 102m in both of the arrays 10a, 10b of FIG. 13 will operate synchronously at a frequency determined by the converter module 100a, 100b, . . . , 100n; 102a, 102b, . . . , 102m having the highest setpoint voltage, and the fraction of the power delivered to the load by each converter module 100a, 100b, . . . , 100n; 102a, 102b, . . . , 102m will be the ratio of the amount of energy that each converter module delivers during each energy transfer cycle to the total of all energy transferred during each cycle by all converters.

Figure 14:
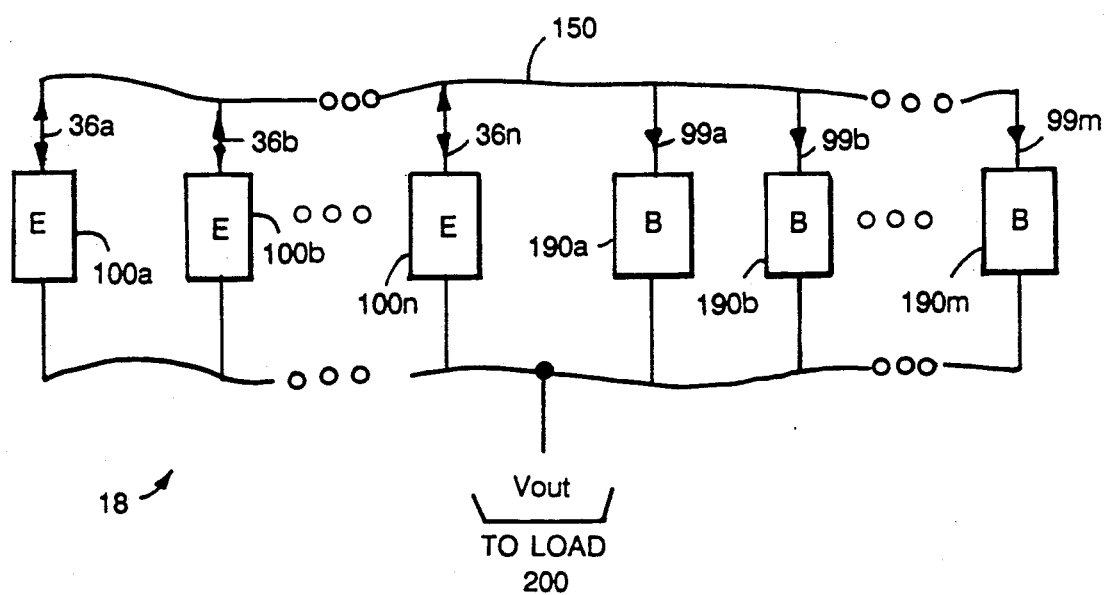
FIG. 14 is a block diagram of a fault tolerant array which combines enhancement-mode converter modules with zero-current switching booster modules.

Arrays may be constructed by combining enhancement-mode converter modules with zero-current switching booster modules (for example, of the kind described in Vinciarelli, U.S. Pat. No. 4,648,020). Because booster modules incorporate only a zero-current switching converter and an input port for receiving synchronizing information, and do not include enhancement-mode controller circuitry or circuitry for outputting synchronizing information, they are typically lower in cost than enhancement-mode converter modules. As a result, "hybrid" arrays which include enhancement-mode converter modules and booster modules will typically be more economical than arrays including only enhancement-mode converter modules. FIG. 14 shows one such array 18 (for clarity, the input voltage sources for the converters are not shown) which includes N enhancement-mode converter modules 100a, 100b, . . . , 100n and M booster modules 190a, 190b, . . . , 190m, all of which include zero-current switching converters with essentially equal characteristic time scales. All of the converter modules are connected by a synchronizing bus 150 (which is shown schematically in the Figure as a line connecting the various converter modules). In such an array, all of the converter modules 100a, 100b, . . . , 100n; 190a, 190b, . . . , 190m will synchronize to an operating frequency determined by the enhancement-mode converter module 100a, 100b, . . . , 100n with the highest value of setpoint voltage, and each of the converter modules will deliver an essentially constant fraction of the total power delivered to the load 200. Failure of one or more of the N+M converter modules 100a, 100b, . . . , 100n; 190a, 190b, . . . , 190m included in the array 18 will not compromise the synchronous, power-sharing characteristic of the array 18, provided that at least one enhancement-mode converter module 100a, 100b, . . . , 100n remains operational and that the power required by the load 200 does not exceed the sum of the power ratings of the balance of the operational modules which are included in the array. In other embodiments the booster modules could have multiple input ports and could connect to multiple independent synchronizing buses in a manner similar to that shown in FIGS. 10A, 10B and 10C.

In all embodiments the input voltages to the various converter modules which are included an array need not be the same. Input voltage will impact the fraction of total load power delivered by a converter, but will not affect the synchronous, fault-tolerant characteristic of the array.

What is claimed is:

1. An enhancement-mode power converter which converts power from an input source for delivery to a load, said enhancement-mode power converter comprising:
   an input power port for connection to said input source,
   an output power port for connection to said load,
   a zero-current switching converter connected to receive power via said input power port from said source and to deliver power via said output power port to said load in a series of quantized energy transfer cycles, and
   an enhancement-mode controller for setting an actual operating frequency at which said energy transfer cycles will occur in said zero-current switching converter, said controller accepting a first input and a second input, said first and second inputs being indicative of a first operating frequency and a second operating frequency, respectively, said controller setting said operating frequency of said zero-current switching converter based upon comparison of said first input to said second input.

2. The enhancement-mode power converter of claim 1 wherein said controller sets said actual operating frequency to correspond to the greater of said first operating frequency or said second operating frequency.

3. The enhancement-mode power converter of claim 1 wherein said zero-current switching converter is characterized by having an equivalent inductance (L) and a capacitance (C) which define a characteristic time scale for the energy transfer cycle of said zero-current switching converter.

4. The enhancement-mode power converter of claim 1 wherein said enhancement-mode controller is characterized by a setpoint voltage (Vsp).

5. The enhancement-mode power converter of claim 1 wherein said first operating frequency is determined by comparing the voltage across said load to said setpoint voltage, said first operating frequency being increased if said load voltage is less than said setpoint voltage, and being decreased if said load voltage is greater than said setpoint voltage.

6. The enhancement mode power converter of claim 1 wherein said second input, indicative of said second operating frequency, comprises synchronizing information carried into said enhancement-mode controller via an input port.

7. The enhancement-mode power converter of claim 6 wherein synchronizing information indicative of said actual operating frequency is delivered by said enhancement-mode controller to an output port.

8. The enhancement-mode power converter of claim 1 wherein synchronizing information indicative of said actual operating frequency is delivered by said enhancement-mode controller to an output port.

9. The enhancement-mode power converter of claim 7 comprising two or more of said input ports, each of said input ports being functionally redundant with respect to the others.

10. The enhancement-mode power converter of claim 7 comprising two or more of said output ports, each of said output ports being functionally redundant with respect to the others.

11. The enhancement-mode power converter of claim 8 comprising two or more of said output ports, each of said output ports being functionally redundant with respect to the others.

12. The enhancement-mode power converter of claim 9 comprising two or more of said output ports, each of said output ports being functionally redundant with respect to the others.

13. The enhancement-mode power converter of claim 7 wherein said input port and said output port are combined into a single bidirectional input-output port, said bidirectional input-output port performing the functions of both said input port and said output port.

14. The enhancement-mode power converter of claim 13 comprising two or more of said bidirectional input-output ports, each of said bidirectional input-output ports being functionally redundant with respect to the others.

15. The enhancement-mode power converter of claim 1, 2, 7, 9, 10, 12, 13 or 14 wherein said enhancement-mode controller comprises
   an output voltage sensor for delivering an error signal indicative of said first operating frequency,
   a switch controller for triggering the onset of energy transfer cycles in said zero-current switching converter, said energy transfer cycles being started and terminated by said switch controller at times of zero current, and
   a timer for selectively setting said actual operating frequency to be the greater of said first operating frequency or said second operating frequency, said timer delivering a series of trigger pulses to said switch controller at a frequency corresponding to said actual operating frequency, said switch controller triggering an energy transfer cycle in said zero-current switching converter in response to each said trigger pulse.

16. The enhancement mode power converter of claim 15 wherein said output voltage sensor comprises a pair of series connected resistors connected as a voltage divider across said output power port.

17. The enhancement mode power converter of claim 16 wherein said output voltage sensor further comprises a reference voltage source.

18. The enhancement mode power converter of claim 17 wherein said output voltage sensor further comprises an error amplifier, one input of said error amplifier being connected between said pair of series connected resistors and the other input being connected to said reference voltage source, said error amplifier delivering an error voltage output indicative of said error signal, wherein said error voltage output will increase if the value of the voltage delivered to said error amplifier by said pair of series connected resistors is less than said reference voltage source, and said error voltage output will decrease if the value of the voltage delivered to said error amplifier by said pair of series connected resistors is greater than said reference voltage source.

19. The enhancement mode power converter of claim 18 wherein said timer comprises
   a pulse generator for delivering said trigger pulses to said switch controller,
   a timing capacitor,
   a current generator connected in series with said timing capacitor for delivering a charging current proportional to said error signal to said timing capacitor,
   a discharge switch connected in parallel with said timing capacitor, said discharge switch being opened and closed in response to a discharge signal delivered by said pulse generator,
   a threshold voltage source,
   a comparator which compares the value of the voltage across said timing capacitor to the value of said threshold voltage source and delivers a threshold signal output to said pulse generator whenever said capacitor voltage becomes equal to or is greater than said threshold voltage source,
   a receiver reference voltage source,
   a control port receiver which connects to said input port and which delivers a momentary input trigger pulse to said pulse generator whenever the value of voltage at said input port exceeds the value of said receiver reference voltage source,
   an output port voltage source,
   a current limiter connected in series with said output port voltage source, and
   a port switch connected between said output port and said current limiter, said port switch delivering an output signal to said output port whenever said port switch is closed, said port switch being opened and closed in response to a port switch signal delivered by said pulse generator.

20. The enhancement mode power converter of claim 15 wherein said timer comprises
   a pulse generator for delivering said trigger pulses to said switch controller,
   a timing capacitor,
   a current generator connected in series with said timing capacitor for delivering a charging current proportional to said error signal to said timing capacitor,
   a discharge switch connected in parallel with said timing capacitor, said discharge switch being opened and closed in response to a discharge signal delivered by said pulse generator,
   a threshold voltage source,
   a comparator which compares the value of the voltage across said timing capacitor to the value of said threshold voltage source and delivers a threshold signal output to said pulse generator whenever said capacitor voltage becomes equal to or is greater than said threshold voltage source,
   a receiver reference voltage source,
   a control port receiver which connects to said input port and which delivers a momentary input trigger pulse to said pulse generator whenever the value of voltage at said input port exceeds the value of said receiver reference voltage source,
   an output port voltage source,
   a current limiter connected in series with said output port voltage source, and a port switch connected between said output port and said current limiter, said port switch delivering an output signal to said output port whenever said port switch is closed, said port switch being opened and closed in response to a port switch signal delivered by said pulse generator.

21. The power converter of claim 20 wherein said trigger pulse, said port switch signal and said discharge signal are delivered at essentially the same time in response to the presence of said threshold signal, provided that said energy transfer cycle is not in progress in said zero-current switching converter, and provided that conditions within said zero-current switching converter are conducive to initiation of another energy transfer cycle within said zero-current switching converter.

22. The power converter of claim 20 wherein said trigger pulse, said port switch signal and said discharge signal are delivered at essentially the same time in response to said momentary input trigger pulse, provided that said energy transfer cycle is not in progress in said zero-current switching converter, and provided that conditions within said zero-current switching converter are conducive to initiation of another energy transfer cycle within said zero-current switching converter.

23. A power system comprising two or more power conversion arrays, each of said power conversion arrays delivering power to a load, each said array comprising at least two enhancement-mode power converters connected between an input source and said load for converting power from said input source for delivery to said load, each said enhancement-mode power converter comprising:
an input power port for connection to said input source,
an output power port for connection to said load,
a zero-current switching converter connected to receive power via said input power port from said source and to deliver power via said output power port to said load in a series of quantized energy transfer cycles, and
an enhancement-mode controller for setting an actual operating frequency at which said energy transfer cycles will occur in said zero-current switching converter, said controller accepting a first input and a second input, said first and second inputs being indicative of a first operating frequency and a second operating frequency, respectively, said controller setting said operating frequency of said zero-current switching converter based upon comparison of said first input to said second input,
said second input, indicative of said second operating frequency, comprising synchronizing information carried into said enhancement-mode controller via an input pot, said synchronizing information indicative of said actual operating frequency being delivered by said enhancement-mode controller to an output port,
each of said input ports being functionally redundant with respect to the others, and two or more of said output ports, each of said output ports being functionally redundant with respect to the others, and
two or more redundant synchronizing buses, each of said synchronizing buses permitting propagation of said synchronizing information between the enhancement-mode power converters which are included in said array,
said enhancement-mode power converters being arranged to operate synchronously at an array operating frequency corresponding to said actual operating frequency of one of said enhancement-mode power converters, and
wherein each of said power conversion arrays is connected to at least one other of said power conversion arrays by an array coupling device which permits delivery of said synchronizing information bidirectionally between said power conversion arrays, all of said enhancement-mode power converters included in said power system operating synchronously at a system operating frequency corresponding to said actual operating frequency of one of said enhancement-mode power converters.

24. A power system comprising two or more power conversion arrays, each of said power conversion arrays delivering power to a load, each said array comprising
at least two enhancement-mode power converters for converting power from an input source for delivery to said load, each said enhancement-mode power converter comprising:
an input power port for connection to said input source,
an output power port for connection to said load,
a zero-current switching converter connected to receive power via sad input power port from said source and to deliver power via said output power port to said load in a series of quantized energy transfer cycles, and
an enhancement-mode controller for setting an actual operating frequency at which said energy transfer cycles will occur in said zero-current switching converter, said controller accepting a first input and a second input, said first and second inputs being indicative of a first operating frequency and a second operating frequency, respectively, said controller setting said operating frequency of said zero-current switching converter based upon comparison of said first input to said second input,
said second input, indicative of said second operating frequency, comprising synchronizing information carried into said enhancement-mode controller via an input port, said synchronizing information indicative of said actual operating frequency being delivered by said enhancement-mode controller to an output port, and
a synchronizing bus permitting propagation of said synchronizing information between said output ports of all said enhancement-mode power converters and said input ports of all said enhancement-mode power converters,
said enhancement-mode power converters being arranged to operate synchronously at an array operating frequency corresponding to said actual operating frequency of one of said enhancement-mode power converters, and
wherein each of said power conversion arrays is connected to at least one other of said power conversion arrays by an array coupling device which permits delivery of said synchronizing information bidirectionally between said power conversion arrays, all of said enhancement-mode power converters included in said power system operating synchronously at a system operating frequency corresponding to said actual operating frequency of one of said enhancement-mode power converters.

25. The power system of claim 24 or 23 wherein said system operating frequency corresponds to said actual operating frequency of said enhancement-mode power converter having the highest value of said setpoint voltage.

26. The power system of claim 24 or 23 wherein the characteristic time scales of all of said enhancement-mode power converters are essentially the same.

27. The power system of claim 24 or 23 wherein said array coupling devices include devices which provide static voltage isolation.

28. The power system of claim 24 or 23 wherein said array coupling devices comprise capacitors.

29. The power system of claim 24 or 23 wherein said setpoint voltages of all of said enhancement mode power converters included in said power system are nominally equal.

30. A power conversion array for delivering power to a load, said array comprising
at least two enhancement-mode power converters for converting power from an input source for delivery to said load, each said enhancement-mode power converter comprising:
an input power port for connection to said input source,
an output power port for connection to said load,
a zero-current switching converter connected to receive power via said input power port from said source and to deliver power via said output power port to said load in a series of quantized energy transfer cycles, and
an enhancement-mode controller for setting an actual operating frequency at which said energy transfer cycles will occur in said zero-current switching converter, said controller accepting a first input and a second input, said first and second inputs being indicative of a first operating frequency and a second operating frequency, respectively, said controller setting said operating frequency of said zero-current switching converter based upon comparison of said first input to said second input,
said second input, indicative of said second operating frequency, comprising synchronizing information carried into said enhancement-mode controller via an input port, said synchronizing information indicative of said actual operating frequency being delivered by said enhancement-mode controller to an output port, and
a synchronizing bus permitting propagation of said synchronizing information between said output ports of all said enhancement-mode power converters and said input ports of all said enhancement-mode power converters,
said enhancement-mode power converters being arranged to operate synchronously at an array operating frequency corresponding to said actual operating frequency of one of said enhancement-mode power converters.

31. The array of claim 30 wherein said synchronizing bus comprises a plurality of bidirectional coupling devices connected in series, each of said bidirectional coupling devices including a signal port for connection to said input port and said output port of one of said enhancement mode converters, the serial connection of said bidirectional coupling devices permitting synchronizing information delivered to any of said signal ports by any of said output ports to be delivered to all of said signal ports included in all of said bidirectional coupling devices for delivery to all of said input ports.

32. The array of claim 31 wherein the serial connection of said bidirectional coupling devices forms a closed ring.

33. A power conversion array for delivering power to a load, said array comprising
at least two enhancement-mode power converters connected between an input source and said load for converting power from said input source for delivery to said load, each said enhancement-mode power converter comprising:
an input power port for connection to said input source,
an output power port for connection to said load,
a zero-current switching converter connected to receive power via said input power port from said source and to deliver power via said output power port to said load in a series of quantized energy transfer cycles, and
an enhancement-mode controller for setting an actual operating frequency at which said energy transfer cycles will occur in said zero-current switching converter, said controller accepting a first input and a second input, said first and second inputs being indicative of a first operating frequency and a second operating frequency, respectively, said controller setting said operating frequency of said zero-current switching converter based upon comparison of said first input to said second input,
said second input, indicative of said second operating frequency, comprising synchronizing information carried into said enhancement-mode controller via an input port, said synchronizing information indicative of said actual operating frequency being delivered by said enhancement-mode controller to an output port,
each of said input ports being functionally redundant with respect to the others, and two or more of said output ports, each of said output ports being functionally redundant with respect to the others, and
two or more redundant synchronizing buses, each of said synchronizing buses permitting propagation of said synchronizing information between the enhancement-mode power converters which are included in said array,
said enhancement-mode power converters being arranged to operate synchronously at an array operating frequency corresponding to said actual operating frequency of one of said enhancement-mode power converters.

34. The array of claim 33 wherein said redundant synchronizing buses permit propagation of said synchronizing information between any said output port and at least one of said input ports of each of said enhancement-mode power converters.

35. The array of claim 33 wherein each said redundant synchronizing bus comprises a plurality of bidirectional coupling devices connected in series, each of said bidirectional coupling devices including a signal port for connection to one of said input ports and one of said output ports on any of said enhancement-mode power converters, and each said enhancement-mode power converter having one of its input ports and one of its output ports connected to at least one said bidirectional coupling device in each of said redundant synchronizing buses, the serial connection of said bidirectional coupling devices in each of said redundant synchronizing buses permitting synchronizing information delivered to any of said signal ports by any of said output ports to be delivered to all of said signal ports included in all of said bidirectional coupling devices for delivery to at least one of said input ports on each of said enhancement-mode power converters.

36. The array of claim 35 wherein the serial connection of said bidirectional coupling devices forms a closed ring.

37. The arrays of claims 31 or 35 wherein said bidirectional coupling devices include devices which provide static voltage isolation.

38. The arrays of claims 31 or 35 wherein said bidirectional coupling devices comprise capacitors.

39. The power conversion array of claim 30 or 33 further comprising at least one booster power converter comprising
   an input power port for connection to said input source,
   an output power port for connection to said load,
   a booster zero-current switching converter connected to receive power via said input power port from said source and to deliver power via said output power port to said load in a series of quantized energy transfer cycles, wherein said booster zero-current switching converter is characterized by having an equivalent inductance (L) and a capacitance (C) which define a characteristic time scale for the energy transfer cycle of said zero-current switching converter, and
   a controller for setting the actual operating frequency at which said energy transfer cycles will occur in said booster zero-current switching converter, said controller accepting an input indicative of said actual operating frequency,
   all of said enhancement-mode power converters and booster power converters included in said power conversion array being arranged to operate synchronously at an array operating frequency corresponding to said actual operating frequency of one of said enhancement-mode power converters.

40. The array of claim 39 wherein said input is delivered to said controller via an input port, said input port of each of said booster power converters being connected to said signal port of one of said bidirectional coupling devices permitting delivery of said synchronizing information to said booster power converters.

41. The power conversion array of claim 39 wherein said input is delivered to said controller via any one of a plurality of redundant input ports, one said input port of each said booster power converter being connected to said signal port of one said bidirectional coupling device in each of said redundant synchronizing buses permitting delivery of said synchronizing information to said booster power converter.

42. The power conversion array of claim 41 wherein said array operating frequency corresponds to said actual operating frequency of said enhancement-mode power converter having the highest value of said setpoint voltage.

43. The power conversion array of claim 41 wherein the characteristic time scales of all of said enhancement-mode power converters are essentially the same.

44. The power conversion array of claim 41 wherein said setpoint voltages of all of said enhancement mode power converters included in said power conversion arrays are nominally equal.

45. The power conversion array of claim 39 wherein said array operating frequency corresponds to said actual operating frequency of said enhancement-mode power converter having the highest value of said setpoint voltage.

46. The power conversion array of claim 39 wherein the characteristic time scales of all of said enhancement-mode power converters are essentially the same.

47. The power conversion array of claim 39 wherein said setpoint voltages of all of said enhancement mode power converters included in said power conversion arrays are nominally equal.

48. The power conversion array of claim 30 or 33 wherein said array operating frequency corresponds to said actual operating frequency of said enhancement-mode power converter having the highest value of said setpoint voltage.

49. The power conversion array of claim 30 or 33 wherein the characteristic time scales of all of said enhancement-mode power converters are essentially the same.

50. The power conversion array of claim 30 or 33 wherein said setpoint voltages of all of said enhancement mode power converters included in said power conversion arrays are nominally equal.

51. A method for controlling a zero-current switching converter of the kind that converts power from an input source for delivery to a load, in a series of quantized energy transfer cycles, comprising,
   accepting first and second inputs indicative of first and second operating frequencies, respectively, and
   setting an actual operating frequency at which said energy transfer cycles will occur based upon comparison of said first input to said second input.

52. The method of claim 51 further comprising determining said first operating frequency by comparing the voltage across said load to a setpoint voltage, and
   increasing said first operating frequency if said load voltage is less than said setpoint voltage, and
   decreasing said first operating frequency if said load voltage is greater than said setpoint voltage.

53. The method of claim 51 further comprising
   sending synchronization information into said controller indicative of said second operating frequency.

54. The method of claim 51 further comprising
   sending out of said controller synchronizing information indicative of the actual operating frequency of said controller.

55. The method of claim 53 further comprising
   receiving said synchronization information indicative of said second operating frequency from another controller.

56. The method of claim 54 further comprising
   sending said synchronization information indicative of the actual operating frequency to another controller for use in said other controller.

57. The method of claim 51 further comprising setting said actual operating frequency to correspond to the greater of said first or second operating frequencies.

* * * * *

UNITED STATES PATENT AND TRADEMARK OFFICE
CERTIFICATE OF CORRECTION

PATENT NO. : 5,079,686
DATED : January 7, 1992
INVENTOR(S) : Patrizio Vinciarelli It is certified that error appears in the above-indentified patent and that said Letters Patent is hereby corrected as shown below:

On the title page, Item [56]:

Reference missing --Patrizio Vinciarelli et al., "Zero-Current Switching Forward Power Conversion with Controllable Energy Transfer", U.S. Serial No. 07/440,882, filed November 22, 1989--.

Column 7, line 52, insert --modules 100a, 100b, ..., 100n. The characteristic time-- after "converter" and before "scales".

Column 10, line 20, "550" should be --350--.

Signed and Sealed this

Thirty-first Day of May, 1994

Attest:

BRUCE LEHMAN

Attesting Officer

Commissioner of Patents and Trademarks